(12) United States Patent
Takahashi et al.

(10) Patent No.: US 11,563,244 B2
(45) Date of Patent: Jan. 24, 2023

(54) POWER STORAGE UNIT AND SOLAR POWER GENERATION UNIT

(71) Applicant: SEMICONDUCTOR ENERGY LABORATORY CO., LTD., Atsugi (JP)

(72) Inventors: Minoru Takahashi, Nagano (JP); Shunpei Yamazaki, Tokyo (JP); Masaaki Hiroki, Kanagawa (JP); Kei Takahashi, Kanagawa (JP); Junpei Momo, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 182 days.

(21) Appl. No.: 17/154,462

(22) Filed: Jan. 21, 2021

(65) Prior Publication Data

US 2021/0143500 A1    May 13, 2021

Related U.S. Application Data

(60) Continuation of application No. 17/008,699, filed on Sep. 1, 2020, now Pat. No. 10,978,757, which is a
(Continued)

(30) Foreign Application Priority Data

Jun. 27, 2012    (JP) .................................. 2012-143765

(51) Int. Cl.
*H02J 7/00* (2006.01)
*H01M 10/44* (2006.01)
(Continued)

(52) U.S. Cl.
CPC ..... *H01M 10/443* (2013.01); *H01M 10/0525* (2013.01); *H01M 10/465* (2013.01);
(Continued)

(58) Field of Classification Search
None
See application file for complete search history.

(56) References Cited

U.S. PATENT DOCUMENTS 3,355,652 A    11/1967    Lindenblad
5,990,661 A    11/1999    Ashtiani et al.
(Continued)

FOREIGN PATENT DOCUMENTS

CN    101079542 A    11/2007
EP    2451004 A    5/2012
(Continued)

OTHER PUBLICATIONS

International Search Report (Application No. PCT/JP2013/067589) dated Aug. 13, 2013.
(Continued)

*Primary Examiner* — Arun C Williams
(74) *Attorney, Agent, or Firm* — Nixon Peabody LLP; Jeffrey L. Costellia

(57) ABSTRACT

Disclosed is a power storage unit which can safely operate over a wide temperature range. The power storage unit includes: a power storage device; a heater for heating the power storage device; a temperature sensor for sensing the temperature of the power storage device; and a control circuit configured to inhibit charge of the power storage device when its temperature is lower than a first temperature or higher than a second temperature. The first temperature is exemplified by a temperature which allows the formation of a dendrite over a negative electrode of the power storage device, whereas the second temperature is exemplified by a temperature which causes decomposition of a passivating film formed over a surface of a negative electrode active material.

13 Claims, 17 Drawing Sheets

Related U.S. Application Data continuation of application No. 15/984,452, filed on May 21, 2018, now Pat. No. 10,797,367, which is a continuation of application No. 15/343,769, filed on Nov. 4, 2016, now Pat. No. 9,991,575, which is a division of application No. 14/715,640, filed on May 19, 2015, now Pat. No. 9,490,510, which is a division of application No. 13/923,431, filed on Jun. 21, 2013, now Pat. No. 9,088,056.

(51) Int. Cl.
| | |
|---|---|
| H01M 10/637 | (2014.01) |
| H01M 10/63 | (2014.01) |
| H01M 10/6571 | (2014.01) |
| H01M 10/46 | (2006.01) |
| H01M 10/48 | (2006.01) |
| H02J 7/35 | (2006.01) |
| H02S 10/20 | (2014.01) |
| H01M 10/615 | (2014.01) |
| H01M 10/0525 | (2010.01) |
| H01M 10/052 | (2010.01) |

(52) U.S. Cl.
CPC ....... *H01M 10/486* (2013.01); *H01M 10/615* (2015.04); *H01M 10/63* (2015.04); *H01M 10/637* (2015.04); *H01M 10/6571* (2015.04); *H02J 7/35* (2013.01); *H02S 10/20* (2014.12); *H01M 10/052* (2013.01); *Y02E 60/10* (2013.01)

(56) References Cited

U.S. PATENT DOCUMENTS

| | | | |
|---|---|---|---|
| 6,307,353 B1 | 10/2001 | Shiojima | |
| 6,337,559 B1* | 1/2002 | Sato | H01M 50/574 320/134 |
| 7,847,522 B2 | 12/2010 | Tashiro et al. | |
| 9,442,505 B2 | 9/2016 | Yokoyama et al. | |
| 2001/0000212 A1 | 4/2001 | Reipur et al. | |
| 2002/0055035 A1 | 5/2002 | Rulison | |
| 2003/0052647 A1* | 3/2003 | Yoshida | H02J 7/007194 320/125 |
| 2003/0114795 A1* | 6/2003 | Faries, Jr. | A61M 5/44 604/113 |
| 2003/0132309 A1* | 7/2003 | Kim | B60S 1/488 239/135 |
| 2003/0162084 A1 | 8/2003 | Shigeta et al. | |
| 2004/0061480 A1 | 4/2004 | Kimura et al. | |
| 2004/0101293 A1* | 5/2004 | Bissonnette | F24H 9/2028 392/484 |
| 2004/0232891 A1 | 11/2004 | Kimoto et al. | |
| 2004/0264951 A1* | 12/2004 | Kuebler | B60S 1/488 392/485 |
| 2005/0242782 A1 | 11/2005 | Kadouchi et al. | |
| 2006/0028167 A1 | 2/2006 | Czubay et al. | |
| 2006/0210868 A1 | 9/2006 | Kim et al. | |
| 2007/0111105 A1 | 5/2007 | Zaghib et al. | |
| 2007/0245900 A1* | 10/2007 | Chen | B67D 1/0895 99/275 |
| 2007/0273328 A1 | 11/2007 | Nam et al. | |
| 2008/0036425 A1 | 2/2008 | Tashiro et al. | |
| 2008/0042621 A1 | 2/2008 | Miglioranza | |
| 2008/0090137 A1 | 4/2008 | Buck | |
| 2008/0124616 A1 | 5/2008 | Miglioranza | |
| 2008/0136368 A1 | 6/2008 | Hajiaghajhani | |
| 2008/0166627 A1 | 7/2008 | Mori et al. | |
| 2009/0017364 A1 | 1/2009 | Manev | |
| 2009/0087723 A1 | 4/2009 | Inda | |
| 2009/0167253 A1 | 7/2009 | Muraoka et al. | |
| 2009/0202890 A1 | 8/2009 | Takeda et al. | |
| 2010/0047672 A1 | 2/2010 | Tamakoshi | |
| 2011/0316486 A1 | 12/2011 | Inaba et al. | |
| 2012/0105010 A1 | 5/2012 | Kinoshita | |
| 2012/0107665 A1 | 5/2012 | Abe et al. | |
| 2013/0147424 A1* | 6/2013 | Takano | H01M 10/66 320/107 |
| 2013/0181682 A1 | 7/2013 | Yoshioka et al. | |
| 2013/0249495 A1 | 9/2013 | Ang | |

FOREIGN PATENT DOCUMENTS

| | | |
|---|---|---|
| JP | 09-190841 A | 7/1997 |
| JP | 09-219279 A | 8/1997 |
| JP | 10-304585 A | 11/1998 |
| JP | 2000-152516 A | 5/2000 |
| JP | 2001-178011 A | 6/2001 |
| JP | 2005-032664 A | 2/2005 |
| JP | 2005-312140 A | 11/2005 |
| JP | 2006-269426 A | 10/2006 |
| JP | 2008-041614 A | 2/2008 |
| JP | 2008-148419 A | 6/2008 |
| JP | 2009-087814 A | 4/2009 |
| JP | 2009-100605 A | 5/2009 |
| JP | 2010-170874 A | 8/2010 |
| JP | 2011-014436 A | 1/2011 |
| JP | 2011-159409 A | 8/2011 |
| JP | 2011-160635 A | 8/2011 |
| JP | 2012-033351 A | 2/2012 |
| TW | 201206019 | 2/2012 |

OTHER PUBLICATIONS

Written Opinion (Application No. PCT/JP2013/067589) dated Aug. 13, 2013.

Taiwanese Office Action (Application No. 102122701) dated Jan. 10, 2017.

Taiwanese Office Action (Application No. 109134812) dated Nov. 4, 2020.

* cited by examiner

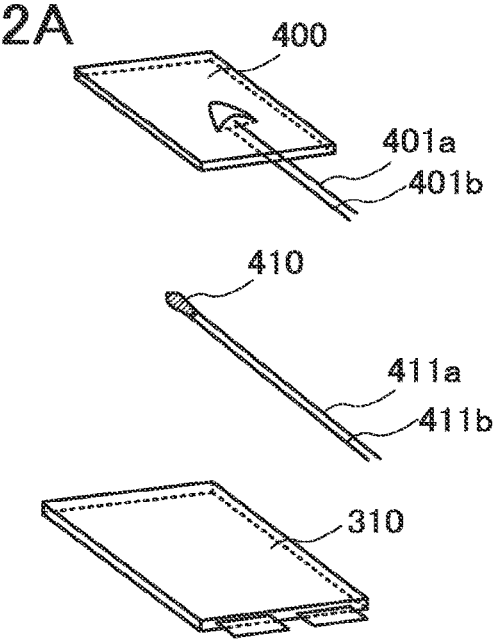
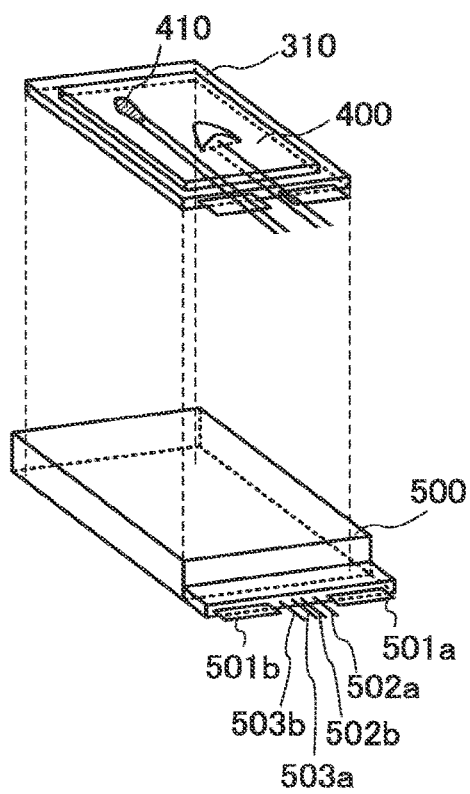
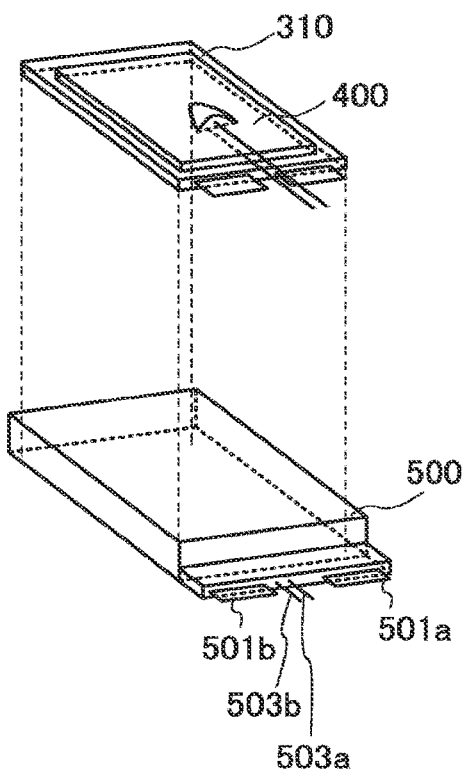

POWER STORAGE UNIT AND SOLAR POWER GENERATION UNIT

TECHNICAL FIELD

The present application relates to a power storage unit and a solar power generation unit.

BACKGROUND ART

In recent years, as power supplies for portable terminals typified by mobile phones and smartphones or for motors of electric vehicles or the like, power storage devices such as lithium secondary batteries have been widely used (see Patent Document 1).

Reference

Patent Document

[Patent Document 1] Japanese Published Patent Application No. 2006-269426

DISCLOSURE OF INVENTION

Such portable terminals, electric vehicles, and the like are used over a wide temperature range from low temperatures to high temperatures. Thus, power storage devices which are included in the portable terminals, electric vehicles, and the like are required to sufficiently exhibit battery characteristics over a wide temperature range from low temperatures to high temperatures.

For example, a lithium secondary battery, which is widely used, includes a positive electrode including an active material such as lithium cobalt oxide ($LiCoO_2$) or lithium iron phosphate ($LiFePO_4$), a negative electrode formed of a carbon material such as graphite which is capable of occlusion and release of lithium ions, a non-aqueous electrolyte solution in which a solute formed of a lithium salt such as $LiBF_4$ or $LiPF_6$ is dissolved in an organic solvent such as ethylene carbonate or diethyl carbonate, and the like.

However, in such a power storage device, specifically a power storage device in which a carbon material such as graphite is used as a negative electrode active material, low temperatures cause electrical resistance of the negative electrode to be increased, so that a negative electrode potential decreases. When the electrode potential becomes negative at the time of charge, dendrite-like lithium (hereinafter, referred to as dendrite) is formed on the carbon material, which leads to problems such as a short circuit between electrodes or formation of irreversible capacity due to separation of the active material. It is thus necessary to perform charge at an electrode potential which does not cause a dendrite to be formed; however, in this case, charge needs to be performed with a lower current in accordance with an increase in resistance of the negative electrode, which prevents high-speed charge.

In a lithium battery in which a carbon material is used for a negative electrode and ethylene carbonate is used as a solvent of an electrolyte solution, the solvent is reduced and decomposed at the time of charge and discharge, whereby a passivating film is formed on a surface of the negative electrode active material. When the passivating film is formed, further reductive decomposition of the electrolyte solution is suppressed, so that insertion of lithium ions predominantly occurs. Accordingly, the power storage device can operate stably.

However, when a power storage device in which a passivating film is formed on a surface of a negative electrode active material is charged at high temperatures, the passivating film is readily decomposed, which endangers the safety of the power storage device.

In addition, a power storage device which includes a non-aqueous solvent as an electrolyte solution might catch fire when charged at a high temperature.

In view of the above, an object of one embodiment of the disclosed invention is to obtain a power storage unit capable of operating safely over a wide temperature range from low temperatures to high temperatures.

An embodiment of the disclosed invention is a power storage unit including a heater provided adjacent to a power storage device to heat the power storage device.

The power storage unit further includes: a temperature sensor which is provided adjacent to the power storage device and senses the temperature of the power storage device; and a control circuit to which temperature data of the power storage device sensed by the temperature sensor is input, where the control circuit controls on/off of the heater.

When the power storage device is charged at a temperature lower than a predetermined temperature (hereinafter referred to as first temperature T1), the control circuit inhibits charge of the power storage device and heats the power storage device with the heater.

The temperatures which are lower than the first temperature are, for example, temperatures at which the above-mentioned dendrite is formed. By avoiding charge at such low temperatures, a short circuit between electrodes or formation of irreversible capacity due to separation of the active material can be prevented. Additionally, an increase in resistance of the negative electrode can be avoided, and high-speed charge can be carried out.

When the power storage device is charged at a temperature higher than or equal to the first temperature, the control circuit allows charge of the power storage device without heating the power storage device with the heater.

Note that the control circuit is structured so that the power storage device is discharged irrespective of the temperature of the power storage device.

As the heater, for example, a positive temperature coefficient (PTC) thermistor can be used. A thermistor is a resistor which exhibits a large change in electrical resistance with respect to temperature. A PTC thermistor is a thermistor having a positive temperature coefficient with which electrical resistance sharply increases at a predetermined temperature (the Curie temperature (Tc), which is also called the Curie point) or higher. Further, when current flows through a PTC thermistor, the resistance increases due to self-heating to hinder the current flow. Such a PTC thermistor having a positive temperature coefficient can be formed by addition of a slight amount of rare earth to $BaTiO_3$, for example.

In the case where the PTC thermistor is used as the heater, the first temperature can be the Curie temperature Tc, whereby on/off of the heater can be switched with the use of a switching function of the PTC thermistor. In this case, the temperature sensor is not necessarily required. Thus, a structure without the temperature sensor is included in one embodiment of the disclosed invention.

Here, the PTC thermistor preferably has the Curie temperature Tc of higher than or equal to 0° C. and lower than or equal to 10° C. Specifically, it is preferable that the Curie temperature Tc be about 5° C., for example.

Alternatively, a heater whose resistance is substantially constant irrespective of temperatures may be used as the heater.

It is preferable to perform only constant current charge, without performing constant voltage charge, when the storage device is charged. This is because constant voltage charge at high temperatures (e.g., 60° C. or higher) lengthens charging time and causes deterioration of the electrolyte solution.

When the temperature of the power storage device is at a second temperature T2 higher than the first temperature, the control circuit can be structured so that charge is inhibited in order to prevent deterioration of the electrolyte solution, damage to the power storage device, or the like. The second temperature may be determined by a user. For instance, the temperature at which the passivating film is decomposed or the ignition temperature of the storage device can be employed as the second temperature.

In the above manner, the power storage device can be charged in an ideal temperature range, and as a result, damage to the power storage device, the malfunction, and a reduction in capacity can be suppressed.

In one embodiment of the disclosed invention, the power storage device is a lithium secondary battery using a carbon material as a negative electrode active material.

One embodiment of the disclosed invention is a solar power generation unit which includes the above power storage unit and a solar cell, where power generated by the solar cell is stored in the power storage device.

According to one embodiment of the disclosed invention, a power storage unit capable of operating safely over a wide temperature range from low temperatures to high temperatures can be obtained.

BRIEF DESCRIPTION OF DRAWINGS

FIGS. 2A to 2C illustrate power storage units.

BEST MODE FOR CARRYING OUT THE INVENTION

Figure 1A:
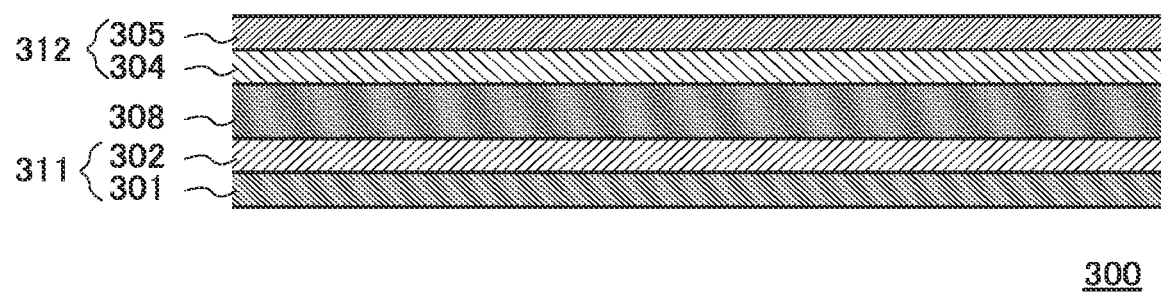
FIGS. 1A and 1B illustrate a power storage device.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to the description in the embodiments. Note that in the drawings hereinafter shown, the same portions or portions having similar functions are denoted by the same reference numerals, and repeated description thereof will be omitted. Further, in some cases, the same hatching patterns are applied to similar parts, and the similar parts are not necessarily designated by reference numerals.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as first, second, and third are used in order to avoid confusion among components, and the terms do not limit the components numerically.

In addition, in this specification and the like, the term such as "electrode" or "wiring" does not limit a function of a component. For example, an "electrode" is sometimes used as part of a "wiring", and vice versa. Further, the term "electrode" or "wiring" can include the case where a plurality of "electrodes" or "wirings" are formed in an integrated manner.

Further, functions of a "source" and a "drain" are sometimes interchanged with each other when a transistor of opposite polarity is used or when the direction of current flow is changed in circuit operation, for example. Therefore, the terms "source" and "drain" can be used to denote the drain and the source, respectively, in this specification.

Note that in this specification and the like, the term "electrically connected" includes the case where components are connected through an object having any electric function. There is no particular limitation on an object having any electric function as long as electric signals can be transmitted and received between components that are connected through the object. Examples of an object having any electric function are a switching element such as a transistor, a resistor, an inductor, a capacitor, and an element with a variety of functions as well as an electrode and a wiring.

Note that in this specification and the like, the term "over" or "below" does not necessarily mean that a component is placed "directly on" or "directly under" another component. For example, the expression "a gate electrode over a gate insulating film" can mean the case where there is an additional component between the gate insulating film and the gate electrode.

Embodiment 1

Embodiment 1 will be described below.
<Structure of Power Storage Device>
A power storage device of this embodiment will be described below.

FIG. 1A is a cross-sectional view of a power storage device 300. The power storage device 300 illustrated in FIG. 1A includes a positive electrode 311 including a positive electrode current collector 301 and a positive electrode active material layer 302; a negative electrode 312 including a negative electrode current collector 305 and a negative electrode active material layer 304; and an electrolyte 308 which is provided between the positive electrode 311 and the negative electrode 312.

The positive electrode 311 is formed in such a manner that the positive electrode active material layer 302 is formed over the positive electrode current collector 301 by a CVD method, a sputtering method, or a coating method.

The positive electrode current collector 301 can be formed using a material that has high conductivity and is not alloyed with lithium or the like, such as a metal typified by stainless steel, gold, platinum, zinc, iron, copper, aluminum, or titanium, or an alloy thereof. The positive electrode current collector 301 can be formed using an aluminum alloy to which an element which improves heat resistance, such as silicon, titanium, neodymium, scandium, or molybdenum, is added. Alternatively, a metal element which forms silicide by reacting with silicon may be used, which is exemplified by zirconium, titanium, hafnium, vanadium, niobium, tantalum, chromium, molybdenum, tungsten, cobalt, nickel, and the like. The positive electrode current collector 301 can have a foil-like shape, a plate-like shape (a sheet-like shape), a net-like shape, a punching-metal shape, an expanded-metal shape, or the like.

The positive electrode active material included in the positive electrode active material layer 302 is a material into/from which carrier ions such as lithium ions can be inserted/extracted. For example, a compound such as $LiFeO_2$, $LiCoO_2$, $LiNiO_2$, $LiMn_2O_4$, $V_2O_5$, $Cr_2O_5$, or $MnO_2$ can be used. The positive electrode active material layer 302 may be formed by a coating method in the following manner: a conductive additive or a binding agent is added to the positive electrode active material to form a positive electrode paste; and the positive electrode paste is applied onto the positive electrode current collector 301 and baked.

An olivine-type lithium-containing composite phosphate ($LiMPO_4$ (general formula) (M is one or more of Fe(II), Mn(II), Co(I), and Ni(II))) can be used for the positive electrode active material. Their typical examples include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \leq 1$, $0<c<1$, $0<d<1$, and $0<e<1$), and $LiFe_fNi_gCo_hMn_iPO_4$ ($f+g+h+i \leq 1$, $0<f<1$, $0<g<1$, $0<h<1$, and $0<i<1$).

A lithium-containing composite silicate such as $Li_{(2-j)}MSiO_4$ (general formula) (M is one or more of Fe(II), Mn(II), Co(II), and Ni(II); $0 \leq j \leq 2$) can be used for the positive electrode active material. Their typical examples include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_aNi_bSiO_4$, $Li_{(2-j)}Fe_aCo_bSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_rNi_sMn_tSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<1$, and $0<u<1$).

In the case where carrier ions are alkali metal ions other than lithium ions such as alkali metal (e.g., sodium or potassium) ions, alkaline-earth metal (e.g., calcium, strontium, or barium) ions, beryllium ions, or magnesium ions, the phosphates or silicates of these metals may be used as the positive electrode active material.

Note that an active material refers to a material that relates to insertion and extraction of ions functioning as carriers. When an electrode is formed, an active material layer in which the active material is mixed with a conductive additive, a binding agent, a solvent, and the like is formed over a current collector. Thus, the active material and the active material layer are distinguished. Therefore, the positive electrode active material and the positive electrode active material layer 302 are distinguished and the negative electrode active material described later and the negative electrode active material layer 304 are distinguished.

The use of graphene as a conductive additive in the positive electrode active material layer 302 is especially effective because an electron-conductive network with high electron conductivity is formed.

A graphene is a carbon material having a crystal structure in which hexagonal skeletons of carbon are two-dimensionally spread and corresponds to one atomic plane extracted from graphite.

The graphene can be provided in a stacked form including 1 to 100 graphene layers. A single-layer graphene may be called a graphene sheet.

In the positive electrode active material layer 302, graphenes may be dispersed so that the graphenes overlap with each other and are in contact with a plurality of positive electrode active material particles. In this case, a network for electron conduction is formed by the graphenes in the positive electrode active material layer 302 by which the plurality of positive electrode active material particles are linked by the graphenes to result in the positive electrode active material layer 302 with high electron conductivity.

As the binding agent (binder) included in the positive electrode active material layer 302, in addition to poly (vinylidene fluoride) (PVDF) as a typical one, polyimide, polytetrafluoroethylene, poly(vinyl chloride), ethylene-propylene-diene polymer, styrene-butadiene rubber, acrylonitrile-butadiene rubber, fluorine rubber, poly(vinyl acetate), poly(methyl methacrylate), polyethylene, nitrocellulose, or the like can be used.

The negative electrode 312 is formed in such a manner that the negative electrode active material layer 304 is formed over the negative electrode current collector 305 by a CVD method, a sputtering method, or a coating method.

For the negative electrode current collector 305, it is possible to use a highly conductive material, for example, a metal such as aluminum, copper, nickel, or titanium, an aluminum-nickel alloy, or an aluminum-copper alloy. The negative electrode current collector 305 can have a foil-like shape, a plate-like shape (a sheet-like shape), a net-like shape, a punching-metal shape, an expanded-metal shape, or the like.

There is no particular limitation on the material for the negative electrode active material which is included in the negative electrode active material layer 304 as long as it is a material with which metal can be dissolved/precipitated or a material into/from which metal ions can be inserted/extracted. For the negative electrode active material, a lithium metal, a carbon-based material, silicon, a silicon alloy, or tin can be used, for example. As the carbon-based material, a graphite powder or a graphite fiber can be used, for example. The negative electrode active material layer 304 may be formed by a coating method in the following manner: a conductive additive or a binder is added to the negative electrode active material to form a negative electrode paste; and the negative electrode paste is applied onto the negative electrode current collector 305 and dried. Specifically, graphene is especially effective as a conductive additive because an electron-conductive network with high conductivity can be formed as described above.

In the case where the negative electrode active material layer 304 is formed using silicon as the negative electrode active material, graphene is preferably formed on a surface of the negative electrode active material layer 304. Because the volume of silicon is greatly changed due to occlusion/release of carrier ions in charge/discharge cycles, adhesion between the negative electrode current collector 305 and the negative electrode active material layer 304 decreases, resulting in degradation of battery characteristics caused by charge and discharge. In view of this, graphene is preferably formed on a surface of the negative electrode active material layer 304 containing silicon because even when the volume of silicon is changed in charge/discharge cycles, the graphene formed on the surface of the negative electrode active material layer 304 suppresses a decrease in adhesion between the negative electrode current collector 305 and the negative electrode active material layer 304. As a result, degradation of battery characteristics is reduced, which is preferable.

Note that the negative electrode active material layer 304 may be predoped with lithium. Predoping with lithium may be performed in such a manner that a lithium layer is formed on a surface of the negative electrode active material layer 304 by a sputtering method. Alternatively, lithium foil is provided on the surface of the negative electrode active material layer 304, whereby the negative electrode active material layer 304 can be predoped with lithium.

The electrolyte 308 provided between the positive electrode 311 and the negative electrode 312 includes a solute and a solvent. As the solute, a material including carrier ions is used. Typical examples of the solute include lithium salts such as $LiClO_4$, $LiAsF_6$, $LiBF_4$, $LiPFF_6$, and $Li(C_2F_5SO_2)_2N$.

In the case where carrier ions are metal ions other than lithium ions, salts of the metal can be used as the solute.

As a solvent for the electrolyte, an aprotic organic solvent which can transfer carrier ions is preferably used. Typical examples include ethylene carbonate (EC), propylene carbonate, dimethyl carbonate, diethyl carbonate (DEC), γ-butyrolactone, acetonitrile, dimethoxyethane, and tetrahydrofuran, and one or more of these solvents can be used. When a gelled high-molecular material is used as the solvent for the electrolyte, safety against liquid leakage and the like is improved. Further, a secondary battery can be thinner and more lightweight. Typical examples include a silicone gel and a gel having, as a main chain skeleton, an acrylic polymer, polyacrlonitrile, poly(ethylene oxide), poly(propylene oxide), a fluorine-based polymer, and the like. Alternatively, one or more of ionic liquids (room temperature molten salts) can be used as the solvent for the electrolyte.

As the electrolyte 308, a solid electrolyte including an inorganic material such as a sulfide, an oxide, or the like can be used. In the case of using such a solid electrolyte, a solid-state battery can be formed; therefore, there is no possibility of liquid leakage and thus the safety of the battery is dramatically increased.

Next, an example of a laminated power storage device is described with reference to FIG. 1B.

Figure 1B:
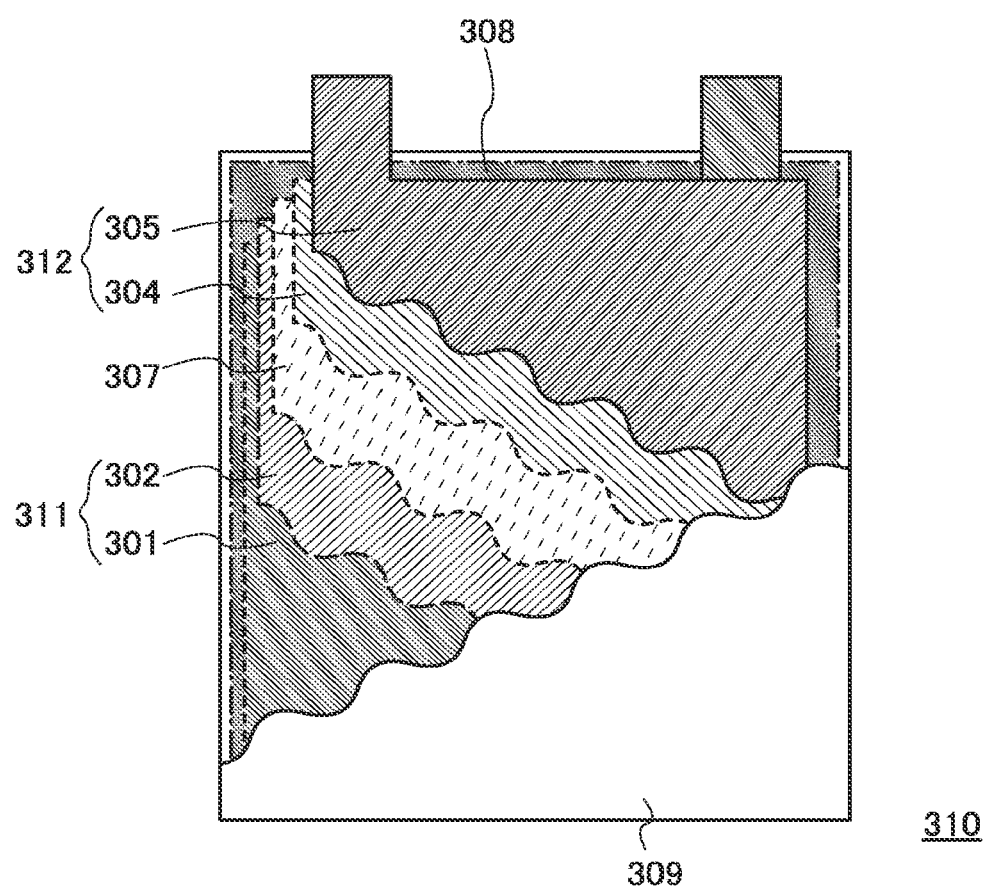

A laminated power storage device 310 illustrated in FIG. 1B includes the positive electrode 311 including the positive electrode current collector 301 and the positive electrode active material layer 302; the negative electrode 312 including the negative electrode current collector 305 and the negative electrode active material layer 304; a separator 307; the electrolyte 308; and an exterior body 309. The separator 307 is placed between the positive electrode 311 and the negative electrode 312 provided in the exterior body 309. The exterior body 309 is filled with the electrolyte 308.

The separator 307 can be formed using an insulator such as cellulose (paper), polypropylene with pores, or polyethylene with pores. The separator 307 is impregnated with the electrolyte 308.

The positive electrode current collector 301 and the negative electrode current collector 305 also function as terminals for electrical contact with the outside. For this reason, the positive electrode current collector 301 and the negative electrode current collector 305 are arranged so that part of the positive electrode current collector 301 and part of the negative electrode current collector 305 are exposed outside the exterior body 309.

As the exterior body 309, for example, a laminate film having a three-layer structure can be used where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film. With such a three-layer structure, permeation of an electrolyte solution and a gas can be blocked and an insulating property and tolerance to the electrolyte can be obtained.

Although the lithium secondary battery is described as an example of the power storage device of this embodiment, the power storage device of one embodiment of the present invention is not limited to this. Other examples of the power storage device of this embodiment include an electric double layer capacitor. The electric double layer capacitor has an advantage in that a dendrite is not formed at a low temperature.

<Structure of Power Storage Unit>

FIGS. 2A to 2C illustrate structures of power storage units of this embodiment. FIG. 2A illustrates the power storage device 310, a heater 400, and a temperature sensor 410 which are included in the power storage unit. The detailed description of the power storage device 310 is not repeated here. Note that although the laminated power storage device 310 is used in FIGS. 2A to 2C, a power storage device having a different shape may be alternatively used. The heater 400 includes a terminal 401a and a terminal 401b, and the temperature sensor 410 includes a terminal 411a and a terminal 411b.

FIG. 2B illustrates a power storage unit in which the power storage device 310, the heater 400, and the temperature sensor 410 are provided in an exterior body 500, and FIG. 2C illustrates a power storage unit in which the power storage device 310 and the heater 400 are provided in the exterior body 500.

In the power storage unit illustrated in FIG. 2B, the temperature sensor 410, the heater 400, and the power storage device 310 are provided adjacent to each other in the exterior body 500. The temperature sensor 410 is provided for sensing of the temperature of the power storage device 310.

In the power storage unit illustrated in FIG. 2C, the temperature sensor 410 is not provided, and the heater 400 and the power storage device 310 are provided in the exterior body 500.

A PTC thermistor is used as the heater 400, for example, by which the heater 400 can be prevented from overheating. In this embodiment, a plate-like PTC thermistor is used as the heater 400 to heat the power storage device 310 uniformly. The PTC thermistor preferably has the Curie temperature T of higher than or equal to 0° C. and lower than or equal to 10° C. Specifically, it is preferable that the Curie temperature Tc be about 5° C., for example.

The heater 400 may be not a PTC thermistor but a heater whose resistance is substantially constant irrespective of temperatures.

As the temperature sensor 410, for example, a negative temperature coefficient (NTC) thermistor is used. An NTC thermistor is a thermistor whose resistance decreases with increasing temperatures. However, the temperature sensor 410 is not limited to an NTC thermistor and another kind of temperature sensor may be used.

The temperature sensor 410 is provided adjacent to the power storage device 310. The temperature sensor 410 senses the temperature T of the storage device 310, and whether the charge is allowed or not is determined in accordance with the temperature T. However, the power storage unit may have a circuit configuration in which a PCT thermistor is used as the heater 400 and the temperature dependence of the electric resistance of the PCT thermistor is utilized to determine whether the charge is allowed or not.

The exterior body 500 is a housing having a space in which the temperature sensor 410, the heater 400, and the power storage device 310 can be provided. As a material of the exterior body 500, for example, a resin such as polyethylene, polypropylene, polycarbonate, ionomer, or polyamide, paper, or ceramic may be used.

A thermal insulating material (e.g., ceramic) is preferably used as the material of the exterior body 500, in which case heat of the heater 400 can be conserved at a low temperature without being dissipated to the outside.

A terminal 501a and a terminal 501b of the exterior body 500 may be terminals electrically connected to the positive electrode current collector 301 and the negative electrode current collector 305 of the power storage device 310; alternatively, the positive electrode current collector 301 and the negative electrode current collector 305 may serve as the terminal 501a and the terminal 501b.

A terminal 502a and a terminal 502b of the exterior body 500 may be terminals electrically connected to the terminal 411a and the terminal 411b of the temperature sensor 410; alternatively, the terminal 411a and the terminal 411b may serve as the terminal 502a and the terminal 502b.

A terminal 503a and a terminal 503b of the exterior body 500 may be terminals electrically connected to the terminal 401a and the terminal 401b of the heater 400; alternatively, the terminal 401a and the terminal 401b may serve as the terminal 503a and the terminal 503b.

In the power storage unit illustrated in FIG. 2B, the temperature sensor 410 senses the temperature of the power storage device 310, and charge of the power storage device 310 is allowed or inhibited in accordance with the temperature.

In this manner, the power storage device 310 can be prevented from being charged at a low temperature and a high temperature, whereby formation of a dendrite, decomposition of a passivating film, and ignition of the power storage device 310 can be prevented.

Note that, as shown in FIG. 2C, the temperature sensor 410 can be omitted in the case where the heater 400 is a PTC thermistor and the power storage unit is used at temperatures lower than a temperature at which the passivating film is broken or temperatures lower than a temperature at which the power storage device 310 catches fire. Owing to its switching function, the PTC thermistor used as the heater 400 can automatically stop heating when the heater 400 reaches high temperatures.

Embodiment 2

Explanation is given below for a circuit which determines whether the charge is allowed or inhibited by utilizing the temperature dependence of electric resistance of a PTC thermistor.

<Circuit Configuration>

Figure 3A:
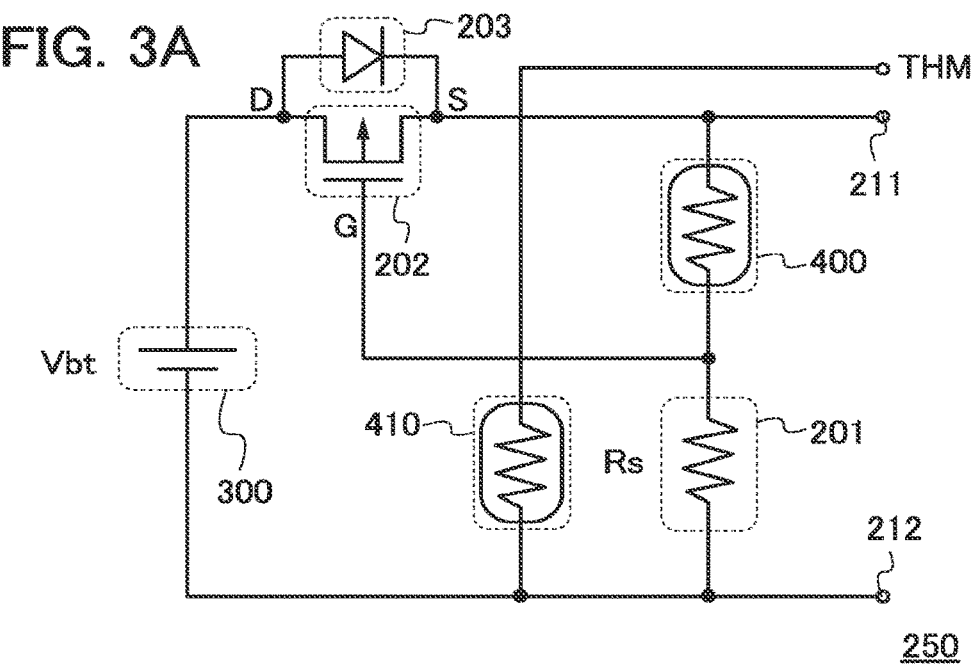
FIG. 3A is a circuit diagram of a power storage unit.

FIG. 3A illustrates part of the circuit of the power storage unit which uses a PTC thermistor as the heater 400.

A circuit 250 illustrated in FIG. 3A includes the power storage device 300, the temperature sensor 410, the heater 400 that is a PTC thermistor, a resistor 201, a transistor 202, a diode 203, a terminal 211, and a terminal 212.

As the power storage device 300, either of the above-described power storage device 310 and a power storage device having a different shape may be used. The positive electrode of the power storage device 300 is electrically connected to a drain (D) of the transistor 202 and an anode of the diode 203. The negative electrode of the power storage device 300 is electrically connected to one terminal of the temperature sensor 410, one terminal of the resistor 201, and the terminal 212. The voltage applied between the positive electrode and the negative electrode of the power storage device 300 is Vbt. Note that a source and a drain of a transistor are interchangeable depending on the voltage applied therebetween. Here, in the case of a p-channel transistor, a terminal having a high potential is called a source and the other terminal having a low potential is called a drain in order to enhance understanding. On the other hand, in the case of an n-channel transistor, a terminal having a high potential is called a drain, and the other terminal having a low potential is called a source.

In the circuit 250 illustrated in FIG. 3A, an NTC thermistor is used as the temperature sensor 410. The temperature sensor 410 is electrically connected to the power storage device 300 and the heater 400, and is provided adjacent to the power storage device 300.

The other terminal of the temperature sensor 410 is electrically connected to a terminal THM.

As described above, the PTC thermistor is used as the heater 400. One terminal of the heater 400 is electrically connected to a gate (G) of the transistor 202 and the other terminal of the resistor 201. The other terminal of the heater 400 is electrically connected to a source (S) of the transistor 202, a cathode of the diode 203, and the terminal 211.

The transistor 202 is a p-channel transistor. Note that the voltage applied between the gate and the source of the transistor 202 is gate voltage VGS.

A resistor with resistance Rs is used as the resistor 201.

Figure 3B:
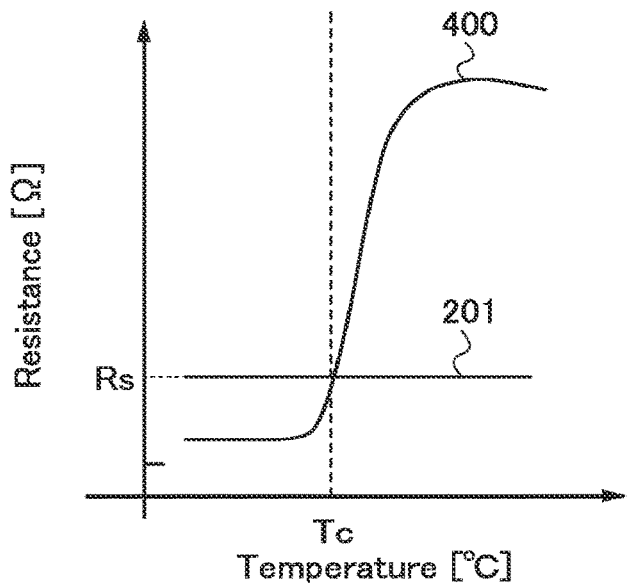
FIG. 3B illustrates a temperature dependence of electric resistance of a heater.

Relations between temperature and resistance in the heater 400 and the resistor 201 are shown in FIG. 3B. As shown in FIG. 3B, the resistance of the heater 400 sharply increases when the temperature exceeds the Curie temperature Tc. In contrast, the resistance Rs of the resistor 201 is substantially constant with changing temperatures.

Figure 3C:
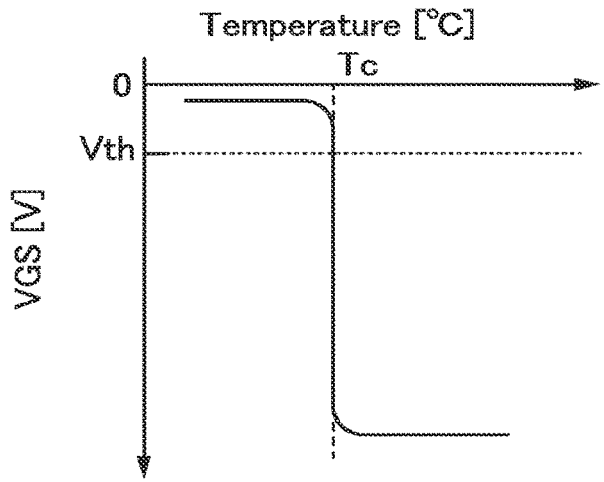
FIG. 3C illustrates a relation between temperature and gate voltage VGS of a transistor.

FIG. 3C shows a relation between temperature and the gate voltage VGS in the transistor 202 at the time of charge (in the state where positive voltage and a negative voltage are applied to the terminal 211 and the terminal 212, respectively). At temperatures lower than the Curie temperature Tc, the gate voltage VGS maintains a constant negative voltage higher than a threshold voltage Vth of the transistor 202, whereby the transistor 202 is off. The gate voltage VGS rapidly decreases at the Curie temperature Tc, and at temperatures higher than or equal to the Curie temperature Tc, the gate voltage VGS becomes a constant negative voltage that is sufficiently lower than the threshold voltage Vth, whereby the transistor 202 is on. In the circuit 250, when the voltage of the drain (the positive electrode of the power storage device 300) is made lower than that of the source (terminal 211) of the transistor 202, a forward bias voltage is applied to the diode 203, which allows discharge of the power storage device 300. In contrast, when the voltage of the drain is higher than that of the source of the transistor 202, the power storage device 300 can be charged, which makes it possible to allow and inhibit charge by switching the transistor 202 because a reverse bias voltage is applied to the diode 203. The details will be described below.

<<Operation at Temperature Lower than the Curie Temperature Tc>>

Figure 4:
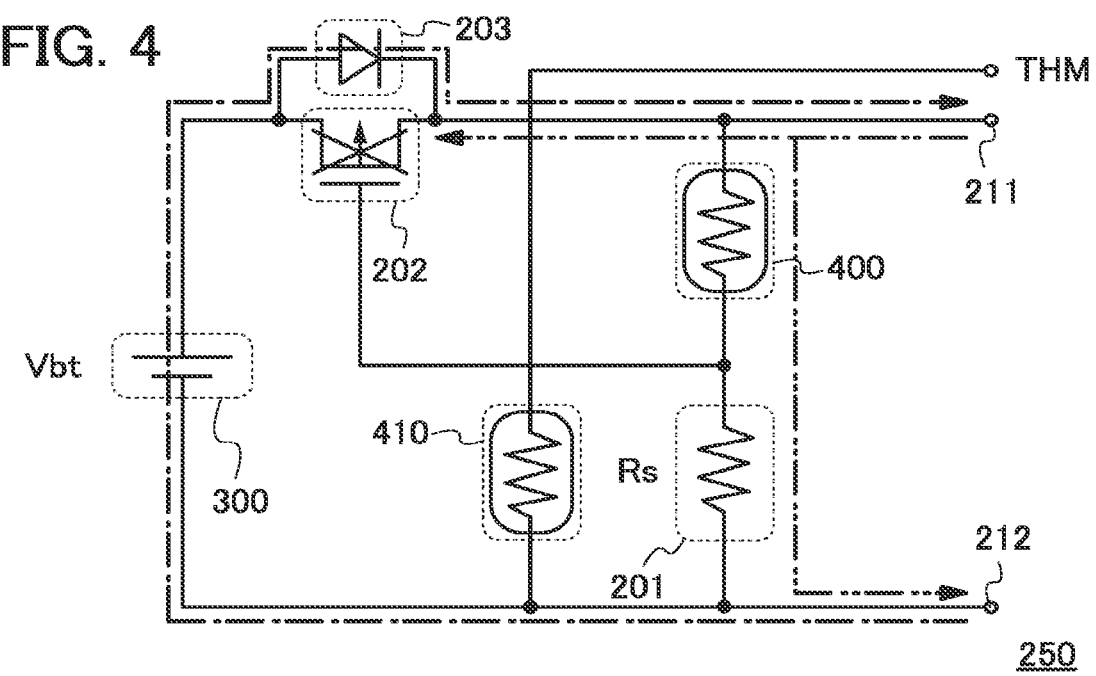
FIG. 4 illustrates operation of a power storage unit at temperatures lower than the Curie temperature Tc.

In FIG. 4, operation of the circuit in FIG. 3A when the temperature T is lower than the Curie temperature Tc is illustrated. In this embodiment, the Curie temperature Tc is higher than or equal to 0° C. and lower than or equal to 10° C., and is specifically approximately 5° C., for example.

In FIG. 4, a dash-dot-dot line denotes current at the time of charge (when positive voltage is applied to the terminal 211 and negative voltage is applied to the terminal 212), and a dash-dot line denotes current at the time of discharge. At temperatures lower than the Curie temperature Tc, the power storage device 300 is not charged but discharge of the power storage device 300 can be performed.

When the heater 400 is placed at a temperature lower than the Curie temperature Tc, the resistance of the heater 400 decreases (see FIG. 3B). Accordingly, current flows through the heater 400 and the resistor 201, and the gate voltage VGS becomes voltage corresponding to the combined resistance of the heater 400 and the resistor 201. When the gate voltage VGS exceeds the threshold voltage Vth (see FIG. 3C), the transistor 202 that is the p-channel transistor is turned off.

In this case, the direction of current flow is the reverse direction of the diode 203, whereby the path of current from the terminal 211 to the power storage device 300 is disconnected, and charge of the power storage device 300 is inhibited.

As illustrated in FIG. 4, current flows through the terminal 211, the heater 400, the resistor 201, and the terminal 212, which allows the heater 400 to generate heat and to heat the power storage device 300.

When the power storage device 300 is heated by the heater 400 and the temperature of the power storage device 300 becomes higher than or equal to the Curie temperature Tc, the resistance of the heater 400 increases to stop the current flow through the heater 400 and turn on the transistor 202. Accordingly, heating by the heater 400 is stopped, and charge of the power storage device 300 is allowed. This operation will be described later in detail.

In contrast, at the time of discharge, although the transistor 202 is off, forward bias voltage is applied to the diode 203. Thus, the discharging current from the power storage device 300 flows through the terminal 212, the power storage device 300, the diode 203, and the terminal 211.

<<Operation at Temperature Higher than or Equal to the Curie Temperature Tc>>

Figure 5:
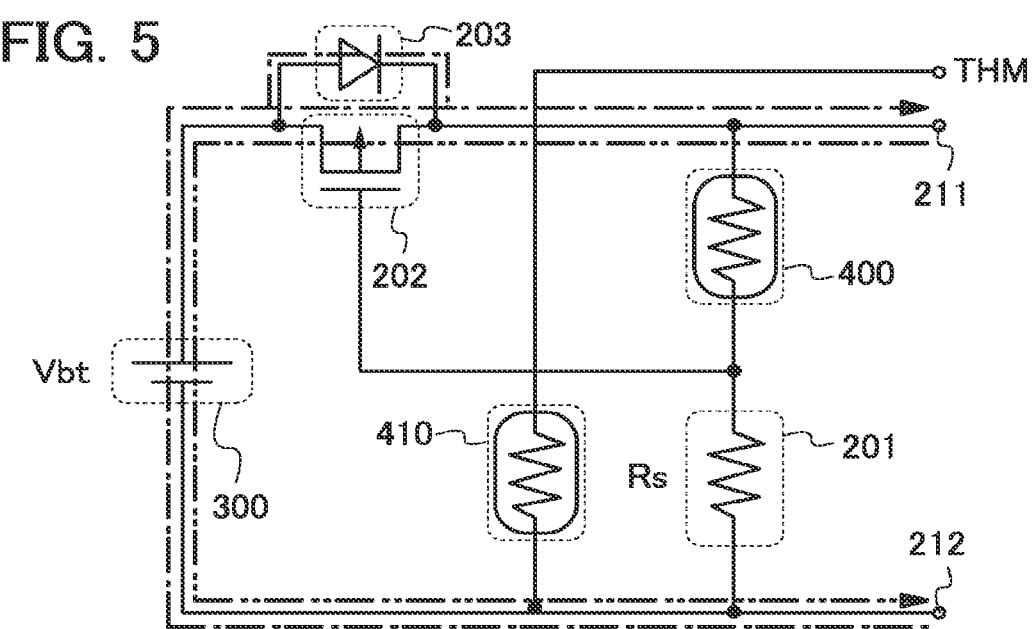
FIG. 5 illustrates operation of a power storage unit at temperatures higher than or equal to the Curie temperature Tc.

In FIG. 5, operation of the circuit 250 in FIG. 3A at a temperature T higher than or equal to the Curie temperature Tc is illustrated.

In FIG. 5, a dash-dot-dot line denotes current at the time of charge (when positive voltage is applied to the terminal 211 and negative voltage is applied to the terminal 212), and a dash-dot line denotes current at the time of discharge. When the heater 400 is placed at temperatures higher than or equal to the Curie temperature Tc, the resistance of the heater 400 increases (see FIG. 3B). Accordingly, current does not flow through the heater 400 and the resistor 201 and the gate voltage VGS of the transistor 202 becomes lower than the threshold voltage Vth (see FIG. 3C).

Since the transistor 202 is a p-channel transistor, the transistor 202 is turned on.

In this state, although charging current flows in the reverse direction of the diode 203, the charging current flows through the terminal 211, the transistor 202, the power storage device 300, and the terminal 212 because the transistor 202 is on. Thus, power is stored in the power storage device 300. That is, charge is allowed.

At the time of discharge, the transistor 202 is on and the direction of flow of discharging current is the forward direction of the diode 203. The discharging current from the power storage device 300 flows through both the transistor 202 and the diode 203. That is, the discharging current from the power storage device 300 flows through the terminal 212, the power storage device 300, the transistor 202, the diode 203, and the terminal 211. In the above manner, the power stored in the power storage device 300 can be discharged.

<<Operation at Temperature Higher than or Equal to Second Temperature T2>>

In the circuit 250 illustrated in FIG. 3A, charge is allowed at the temperature T higher than or equal to the Curie temperature Tc. Therefore, charge is allowed even if the temperature T of the power storage device 300 becomes high enough to break the passivating film or to ignite the power storage device 300.

In view of the above, as the upper limit of the temperature T of the power storage device 300, the second temperature T2 is set by a user, and the power storage unit is configured so that, when the temperature T of the power storage device 300 which is sensed by the temperature sensor 410 reaches T2, charge of the power storage device 300 is inhibited. In this manner, it is possible to prevent breakage of the passivating film and to prevent the power storage device 300 from catching fire.

Accordingly, a power storage unit which can safely operate at a low temperature and a high temperature can be obtained.

Figure 6:
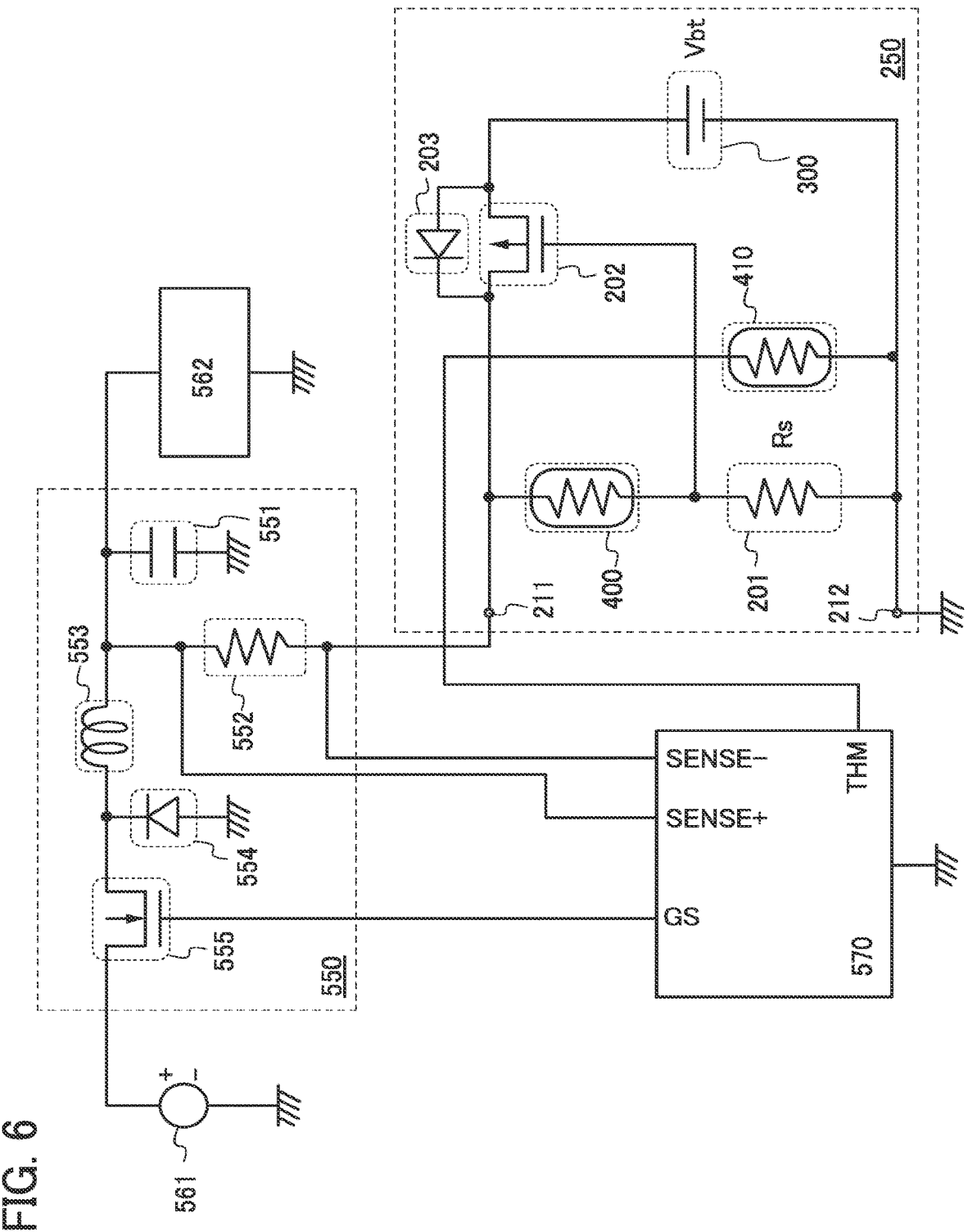
FIG. 6 is a diagram illustrating a power storage unit.

FIG. 6 illustrates the power storage unit which includes the circuit 250. The power storage unit further includes a current control circuit 550 and a control circuit 570, and is capable of being connected to a power source 561 and a load 562.

The current control circuit 550 is a current control circuit using a step-down DC-DC converter and includes a capacitor 551, a resistor 552, a coil 553, a diode 554, and a transistor 555.

One terminal of the capacitor 551 is electrically connected to one terminal of the resistor 552, one terminal of the coil 553, and a terminal SENSE+ of the control circuit 570. The one terminal of the capacitor 551 is configured to be connected to the load 562 when the power storage device 300 is discharged. The other terminal of the capacitor 551 is grounded.

The other terminal of the resistor 552 is electrically connected to a terminal SENSE− of the control circuit 570 and the terminal 211 of the circuit 250. The voltage applied between the terminals of the resistor 552 is equal to the voltage applied to each of the terminal SENSE+ and the terminal SENSE− of the control circuit 570. Accordingly, the current flowing through the resistor 552 can be measured.

The other terminal of the coil 553 is electrically connected to a cathode of the diode 554 and a drain of the transistor 555.

An anode of the diode 554 is grounded.

The transistor 555 is an n-channel transistor and a gate thereof is electrically connected to a terminal GS of the control circuit 570.

The source of the transistor 555 is configured to be electrically connected to the power source 561 when the power storage device 300 is charged.

The power source 561 supplies power for charging the power storage device 300. The power source 561 can be a DC power source or an AC power source (e.g., a commercial power source), and an alternate current-direct current converter (which is also referred to as an AC-DC converter or an AC-DC inverter) which converts AC power of the AC power source into DC power may be used when an AC power source is used.

The control circuit 570 senses the voltage of the terminal SENSE+ and that of the terminal SENSE−, thereby measuring the current flowing between the terminal SENSE+ and the terminal SENSE−, i.e., the current flowing through the resistor 552. The control circuit 570 generates a pulse width modulation (PWM) signal on the basis of the data (signal) input to the terminal THF from the temperature sensor 410 and inputs the PWM signal from the terminal GS to the gate of the transistor 555, thereby controlling the current flowing through the resistor 552. The control of the current flowing through the resistor 552 means that the current flowing between the terminal 211 and the terminal 212 of the circuit 250 is controlled. More specifically, the charging current to the power storage device 300 or the discharging current from the power storage device 300 is controlled.

At a temperature higher than or equal to the temperature T2, the control circuit 570 turns off the transistor 555 on the basis of data on the temperature T of the power storage device 300 sensed by the temperature sensor 410 which is input to the terminal THM, thereby inhibiting charging of the power storage device 300.

According to this embodiment, a power storage unit which can safely operate at a low temperature and a high temperature can be obtained.

Figure 14:
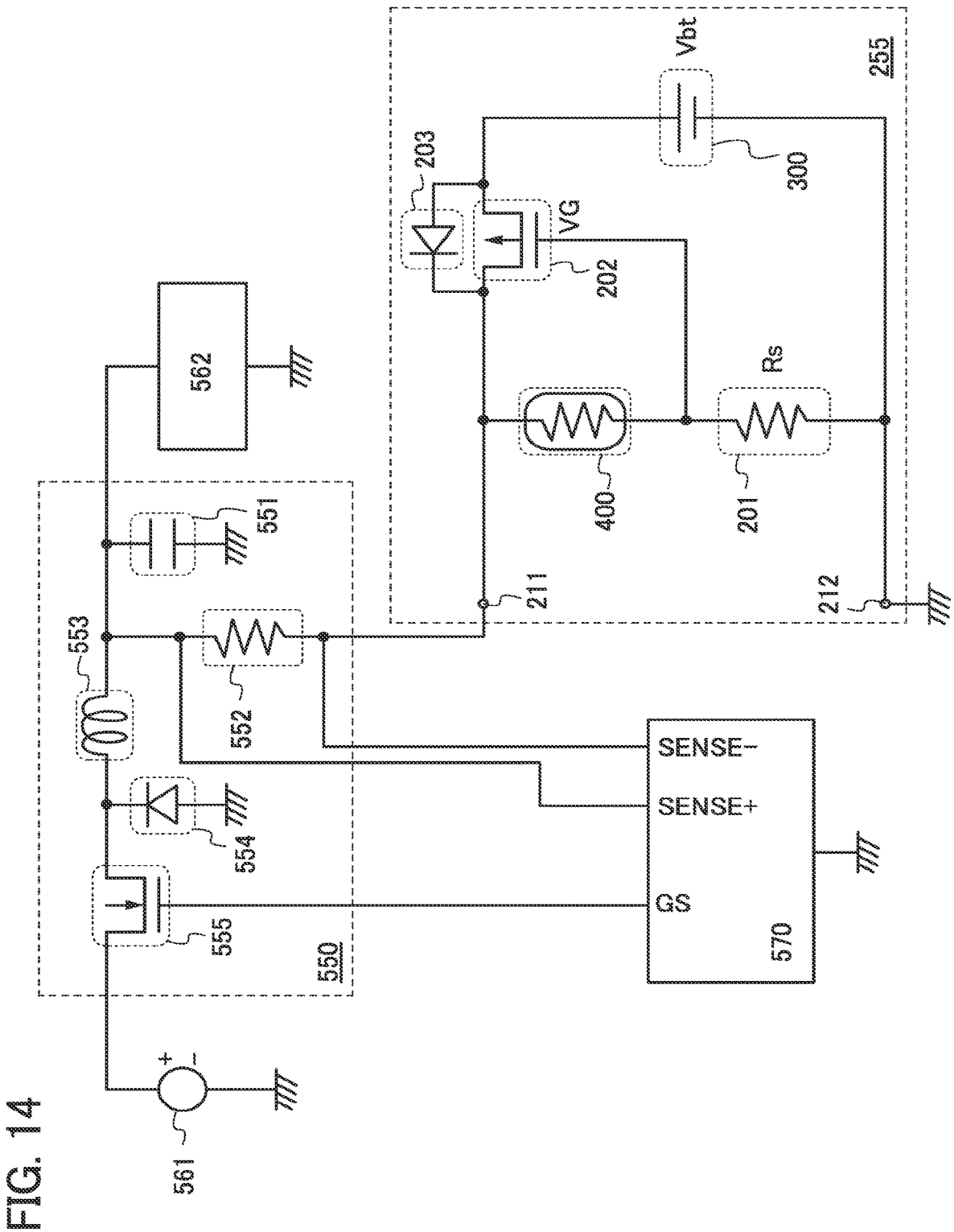
FIG. 14 is a circuit diagram illustrating a power storage unit.

FIG. 14 illustrates a power storage unit having the configuration (see FIG. 2C) in which the temperature sensor 410 is omitted.

As long as the power storage unit is used below a temperature which causes the decomposition of the passivating film or the ignition of the power storage device 300, it is possible to obtain a power storage unit capable of being charged in an ideal temperature range by using the circuit illustrated in FIG. 14.

According to this embodiment, a power storage unit which can safely operate at a low temperature and a high temperature can be obtained.

The structures, methods, and the like described in this embodiment can be combined as appropriate with any of the structures, methods, and the like described in the other embodiments.

Embodiment 3

In this embodiment, a power storage unit which uses, instead of a PTC thermistor, a heater whose resistance is substantially constant irrespective of temperatures as the heater 400 and a temperature sensor will be described.

<Circuit Configuration 1>

Figure 7A:
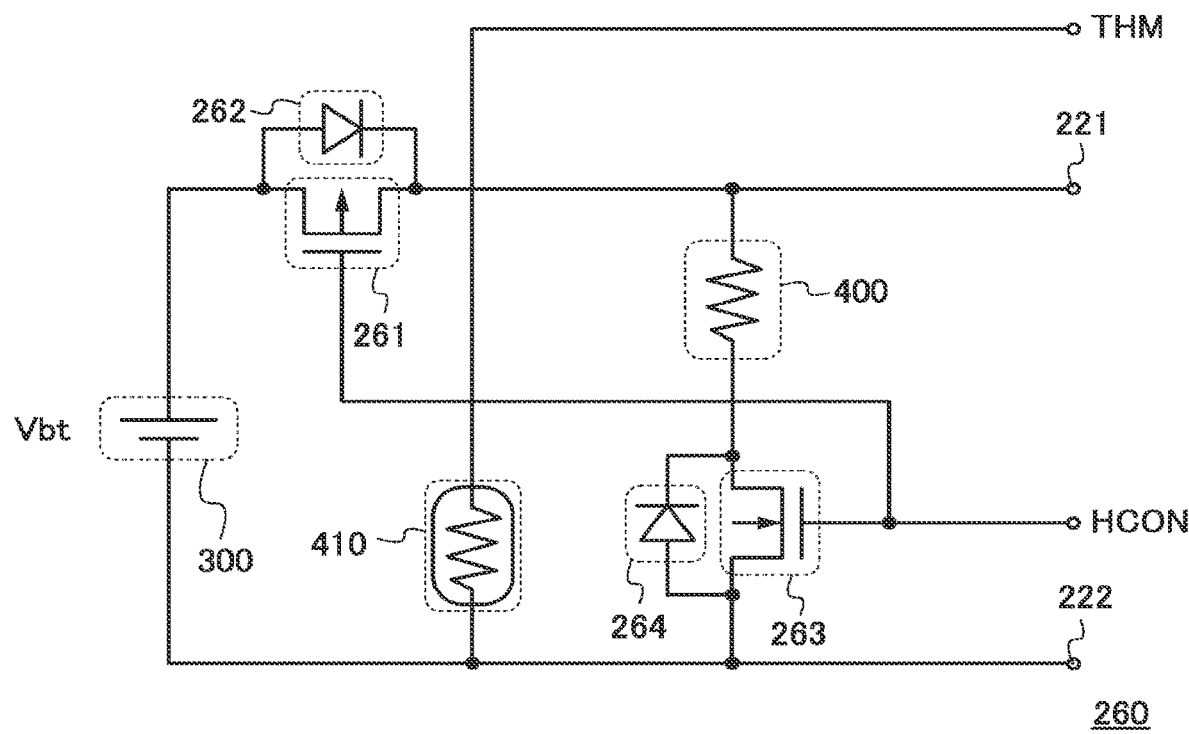
FIG. 7A is a circuit diagram illustrating a power storage unit.

FIG. 7A illustrates part of the circuit of the power storage unit according to this embodiment.

In a circuit 260 illustrated in FIG. 7A, the power storage device 300, the temperature sensor 410, the heater 400, a transistor 261, a diode 262, a transistor 263, a diode 264, a terminal 221, a terminal 222, the terminal THM, and a terminal HCON are included.

The positive electrode of the power storage device 300 is electrically connected to a drain of the transistor 261 and an anode of the diode 262. The negative electrode of the power storage device 300 is electrically connected to the one terminal of the temperature sensor 410, a source of the transistor 263, an anode of the diode 264, and the terminal 222. The voltage applied between the positive electrode and the negative electrode of the power storage device 300 is Vbt.

The one terminal of the heater 400 is electrically connected to a source of the transistor 261, a cathode of the diode 262, and the terminal 221. The other terminal of the heater 400 is electrically connected to a drain of the transistor 263 and a cathode of the diode 264.

In this embodiment, an NTC thermistor is used as the temperature sensor 410. The temperature sensor 410 is provided adjacent to the power storage device 300. Note that for switching of operation based on the temperature of the heater 400 which will be described later, the power storage device 300, the heater 400, and the temperature sensor 410 are preferably provided as close as possible to each other. The other terminal of the temperature sensor 410 is electrically connected to the terminal THM.

The transistor 261 is a p-channel transistor a gate of which is electrically connected to a gate of the transistor 263 and the terminal HCON. The transistor 263 is an n-channel transistor.

Figure 7B:
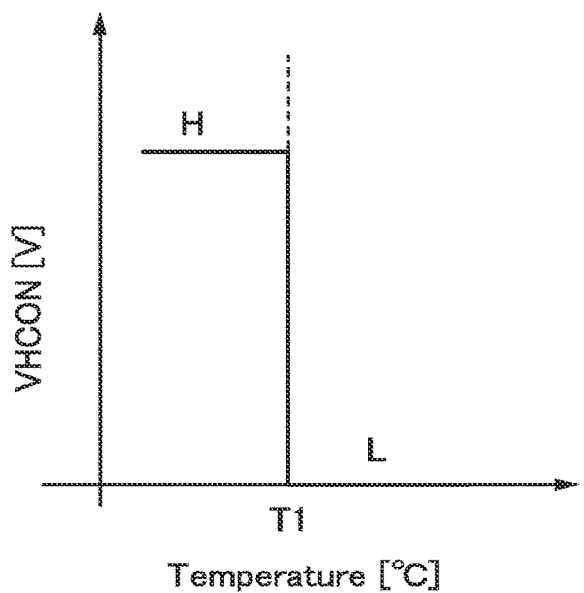
FIG. 7B illustrates a relation between temperature and voltage applied to a gate of a transistor.

FIG. 7B shows a relation between voltage $V_{HCON}$ applied to the gate of the transistor 261 and the gate of the transistor 263 (voltage applied to the terminal HCON) and a temperature. Note that the temperature T shown in FIG. 7B is sensed by the temperature sensor 410.

In the case where the temperature T is lower than the temperature T1, the voltage $V_{HCON}$ is high-level voltage (which is denoted as "H"). Here, high-level voltage (H) is voltage higher than the threshold voltage of the transistor 261 that is a p-channel transistor and the threshold voltage of the transistor 263 that is an n-channel transistor.

In the case where the temperature T is higher than or equal to the temperature T1, the voltage $V_{HCON}$ is low-level voltage (which is denoted as "L"). Here, low-level voltage (L) is voltage lower than the threshold voltage of the transistor 261 that is a p-channel transistor and the threshold voltage of the transistor 263 that is an n-channel transistor. Note that the temperature T1 is a given temperature which is set by a user. The details on the operation of the circuit will be described below.

<<Operation at Temperature Lower than T1>>

Figure 8:
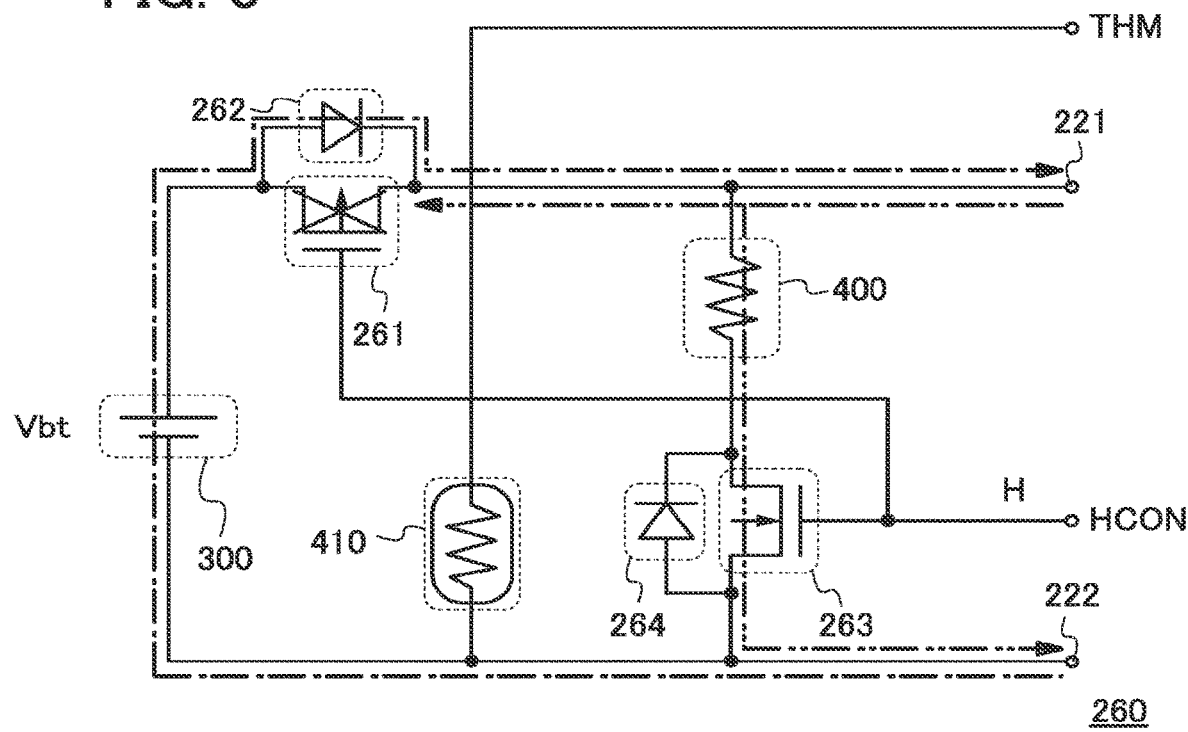
FIG. 8 illustrates operation of a power storage unit at temperatures lower than temperature T1.

In FIG. 8, operation of the circuit 260 in FIG. 7A when the temperature T is lower than the temperature T1 is illustrated.

In FIG. 8, a dash-dot-dot line denotes current when positive voltage is applied to the terminal 221 and negative voltage is applied to the terminal 222, and a dash-dot line denotes current at the time of discharge.

When the temperature is lower than T1, the voltage $V_{HCON}$ is set at the high-level voltage (H) (see FIG. 7B). When the high-level voltage (I) is applied to the gates, the transistor 261 that is a p-channel transistor is turned off, and the transistor 263 that is an n-channel transistor is turned on.

In this case, current flows through the terminal 221, the heater 400, the transistor 263, and the terminal 222. Note that because the direction of the current flow is the reverse direction of the diode 264, the current does not flow through the diode 264. Accordingly, the heater 400 generates heat to heat the power storage device 300.

Since the transistor 261 is off and the direction of the current flow is the reverse direction of the diode 262, the path of the current to the power storage device 300 is disconnected and the power storage device 300 is not charged.

When the temperature of the power storage device 300 is higher than or equal to the temperature T1 as a result of the heating of the power storage device 300 by the heater 400, the heating by the heater 400 is stopped and charge of the power storage device 300 is allowed. This operation will be described later in detail.

In contrast, at the time of discharge, the direction of flow of discharging current is the forward direction of the diode 262 regardless of the state of the transistor 261. That is, the discharging current from the power storage device 300 flows through the terminal 222, the power storage device 300, the diode 262, and the terminal 221. In the above manner, the power storage device 300 can be discharged.

<<Operation at Temperature Higher than or Equal to T1>>

Figure 9:
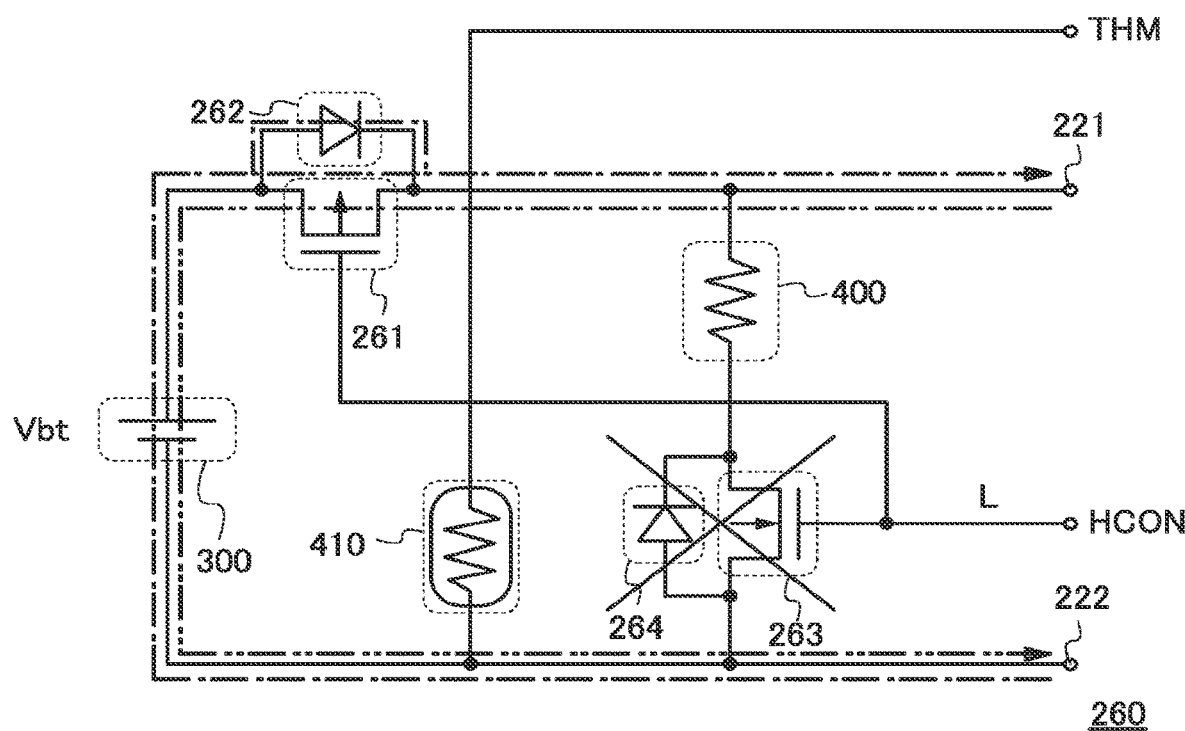
FIG. 9 illustrates operation of a power storage unit at temperatures higher than or equal to temperature T1.

In FIG. 9, operation of the circuit 260 in FIG. 7A when the temperature T is higher than or equal to T1 is illustrated.

In FIG. 9, a dash-dot-dot line denotes current at the time of charge (when positive voltage is applied to the terminal 221 and negative voltage is applied to the terminal 222), and a dash-dot line denotes current at the time of discharge.

When the temperature is higher than or equal to T1, the voltage $V_{HCON}$ is set at the low-level voltage (L) (see FIG. 7B). When the low-level voltage (L) is applied to the gates, the transistor 261 that is a p-channel transistor is turned on, and the transistor 263 that is an n-channel transistor is turned off. Because the transistor 263 is off and the direction of current flow is the reverse direction of the diode 264, the current does not flow through the heater 400.

When charge is performed in the above state, although the transistor 261 is on, charging current flows in the reverse direction of the diode 262; thus, the charging current from the terminal 221 to the power storage device 300 flows only the transistor 261. By the flow of the charging current through the terminal 221, the source and the drain of the transistor 261, the power storage device 300, and the terminal 222, the power storage device 300 is charged.

At the time of discharge, the transistor 261 is on and the direction of flow of discharging current is the forward direction of the diode 262. The discharging current from the power storage device 300 flows both the transistor 261 and the diode 262. That is, the discharging current from the power storage device 300 flows through the terminal 222, the power storage device 300, the source and the drain of the transistor 261, the diode 262, and the terminal 221. In the above manner, the power storage device 300 can be discharged.

<<Operation at Temperature Higher than or Equal to T2>>

In the circuit 260 illustrated in FIG. 7A, charge is allowed at a temperature higher than or equal to T1 as described above. Therefore, charge is allowed even after the temperature T of the power storage device 300 becomes high enough to break the passivating film or to ignite the power storage device 300.

In view of the above, the upper limit of the temperature T of the power storage device 300 (the upper-limit temperature T2) is set by a user, and when the temperature of the power storage device 300 which is sensed by the temperature sensor 410 reaches T2, charge of the power storage device 300 is inhibited. In this manner, it is possible to prevent breakage of the passivating film and to prevent the power storage device 300 from catching fire.

Accordingly, a power storage unit which can safely operate at a low temperature and a high temperature can be obtained.

Figure 10:
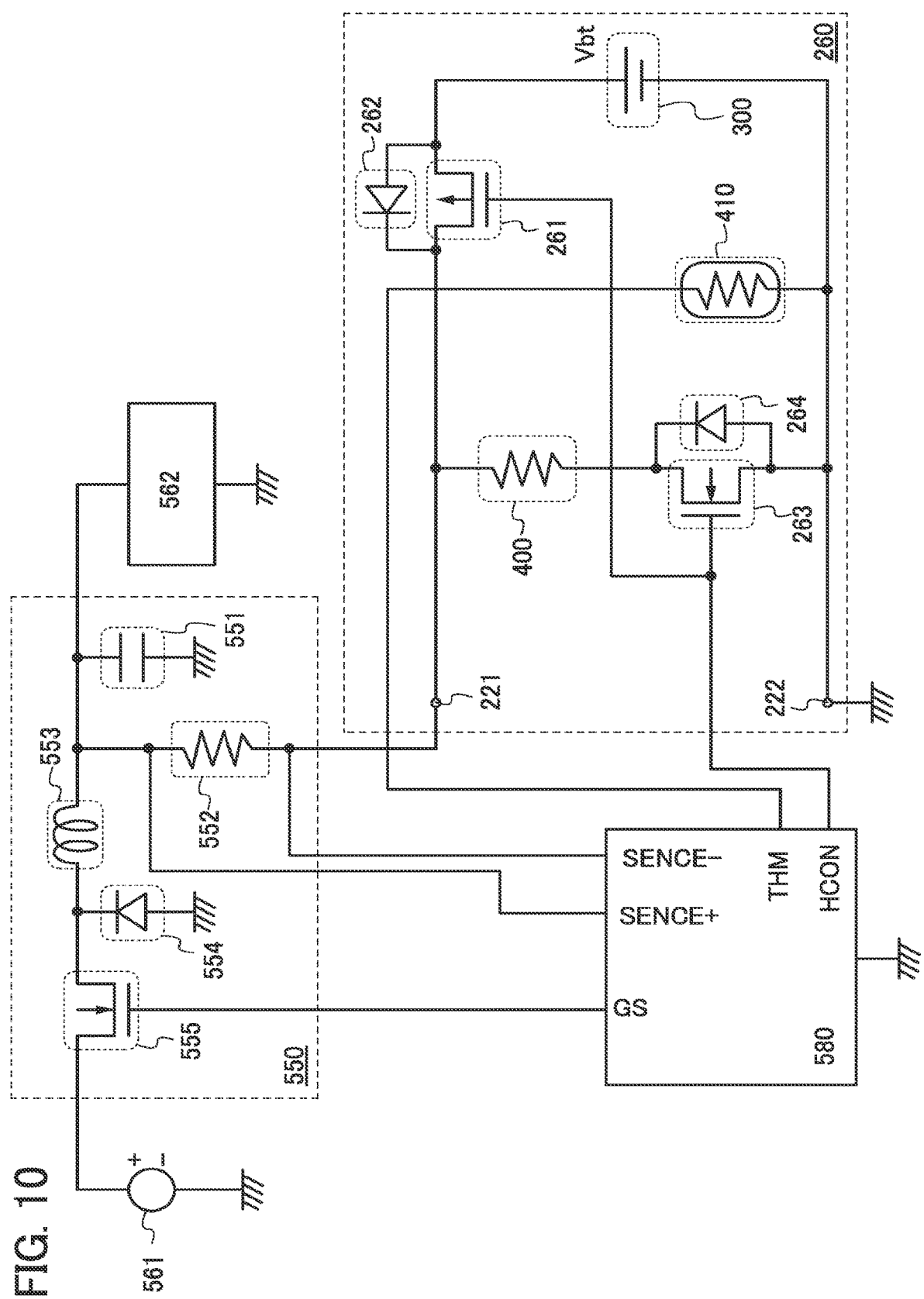
FIG. 10 is a circuit diagram illustrating a power storage unit.

FIG. 10 illustrates the circuit of the power storage unit which includes the circuit 260. The power storage unit includes the circuit 260, the current control circuit 550, and a control circuit 580.

The control circuit 580 is configured to receive data on the temperature sensor 410 with the terminal THM and switch the voltage $V_{HCON}$ of the terminal HCON between the high-level voltage (H) and the low-level voltage (L) on the basis of the data. The control circuit 580 senses the voltage of the terminal SENSE+ and that of the terminal SENSE−, thereby measuring the current flowing between the terminal SENSE+ and the terminal SENSE−, i.e., the current flowing through the resistor 552. Further, the control circuit 580 inputs a pulse width modulation signal from the terminal GS to the gate of the transistor 555, thereby controlling the value of the current flowing through the resistor 552.

At a temperature lower than the temperature T1 or higher than or equal to the temperature T2, the control circuit 580 inputs, as the voltage $V_{HCON}$, the high-level voltage to the gates of the transistor 261 and the transistor 263 on the basis of the data on the temperature T of the power storage device 300, thereby inhibiting charge of the power storage device 300. In addition, the control circuit 580 turns off the transistor 555 by controlling the pulse width modulation signal, thereby inhibiting the charge of the power storage device 300 with the power source 561.

At a temperature higher than or equal to the upper-limit temperature T2, the control circuit 580 turns off the transistor 555 by controlling the pulse width modulation signal, on the basis of data on the temperature T of the power storage device 300, thereby inhibiting the charge of the power storage device 300 with the power source 561.

<Circuit Configuration 2>

A power storage unit having a circuit configuration different from the configurations illustrated in FIG. 7A and FIG. 10 will be described below.

Figure 11:
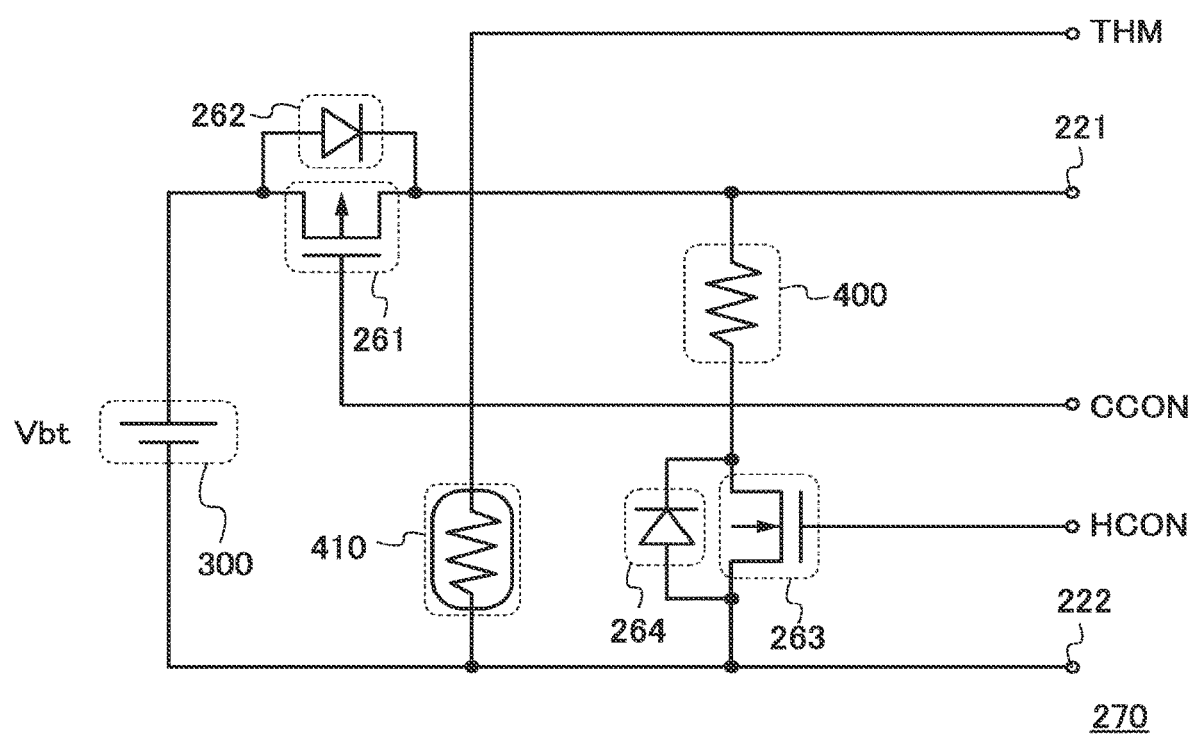
FIG. 11 is a circuit diagram illustrating a power storage unit.

A circuit 270 illustrated in FIG. 11 is different from the circuit 260 illustrated in FIG. 7A in that the gate of the transistor 261 is electrically connected to a terminal CCON, not the terminal HCON. That is, application of voltage to the gate of the transistor 261 and the gate of the transistor 263, which is performed through the terminal HCON in the circuit 260 in FIG. 7A, is performed through separate terminals, the terminal CCON and the terminal HCON in the circuit 270 in FIG. 11.

<<Operation at Temperature Lower than T1>>

Figure 12A:
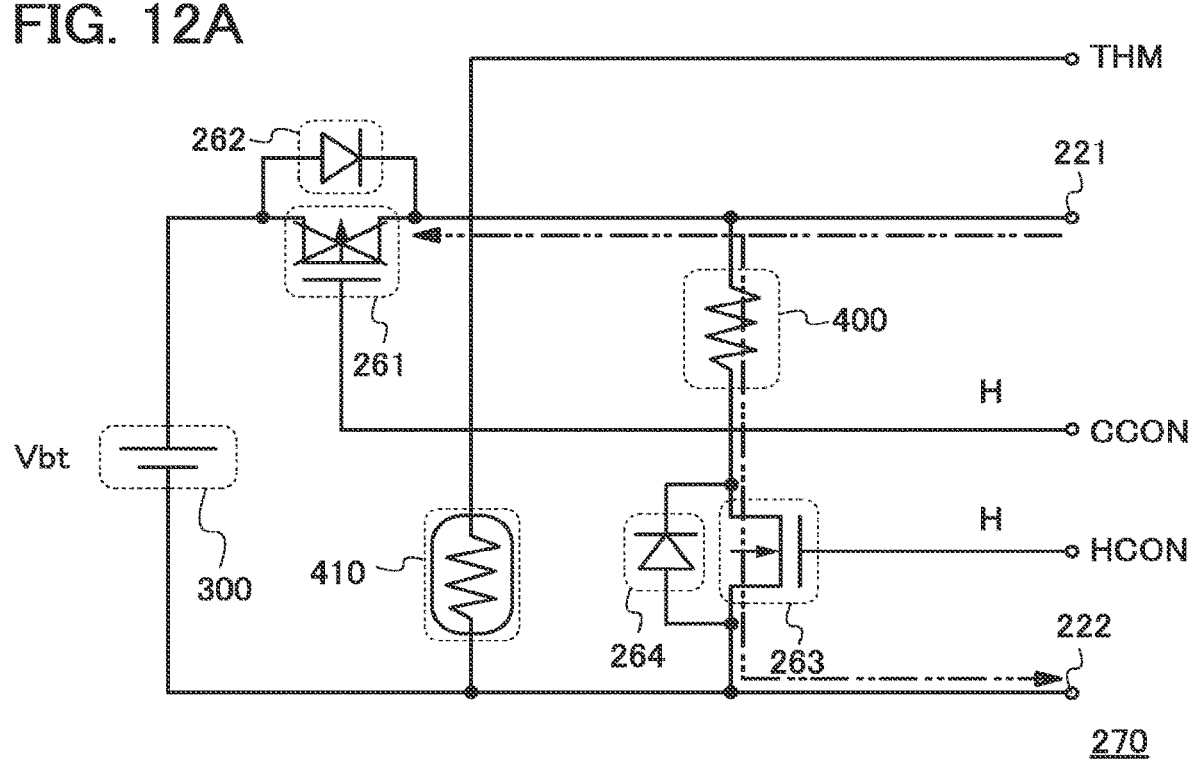
FIGS. 12A and 12B illustrate operation of a power storage unit at temperatures lower than temperature T1.
Figure 12B:
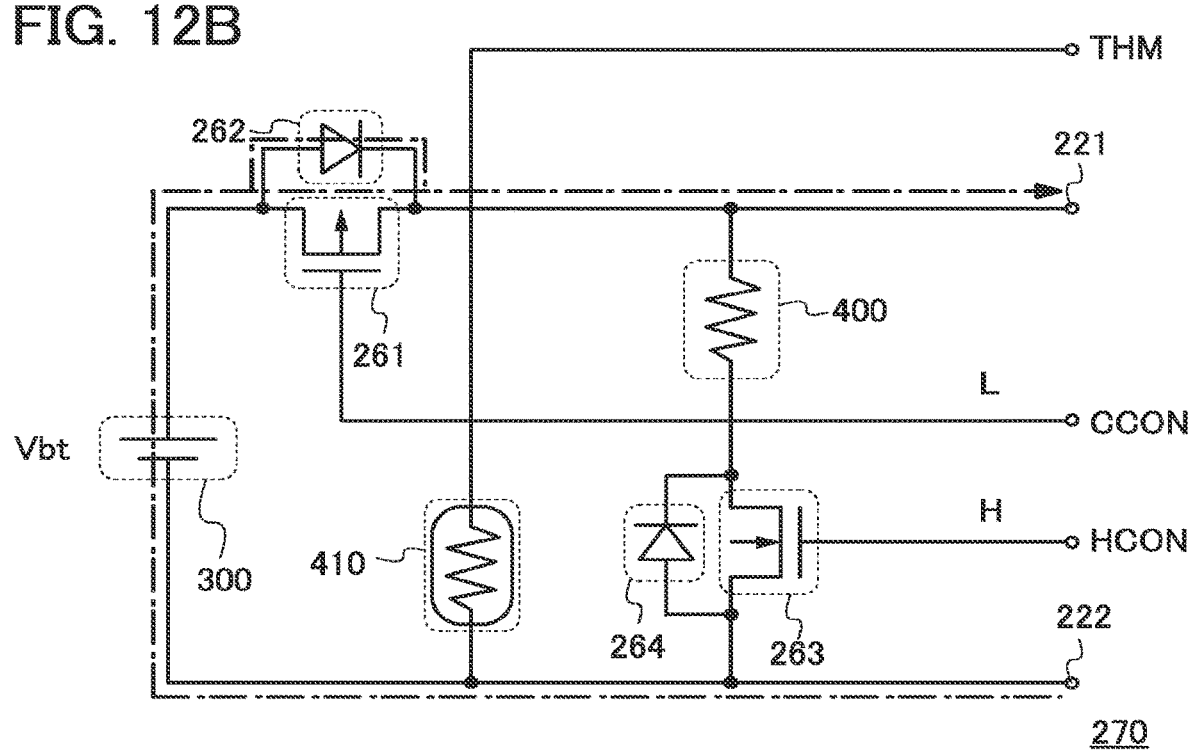

In FIGS. 12A and 12B, operation of the circuit 270 in FIG. 11 when the temperature T is lower than T1 is illustrated.

In FIG. 12A, a dash-dot-dot line denotes current when positive voltage is applied to the terminal 221 and negative voltage is applied to the terminal 222, and in FIG. 12B, a dash-dot line denotes current at the time of discharge.

As shown in FIG. 12A, positive voltage and negative voltage are applied to the terminal 221 and the terminal 222, respectively, and the voltage $V_{HCON}$ and voltage $V_{CCON}$ are the high-level voltage (H).

When the high-level voltage (H) is applied to the gates, the transistor 261 that is a p-channel transistor is turned off, and the transistor 263 that is an n-channel transistor is turned on.

In this case, current flows through the terminal 221, the heater 400, the transistor 263, and the terminal 222. Note that because the direction of the current flow is the reverse direction of the diode 264, the current does not flow through the diode 264. Accordingly, the heater 400 generates heat to heat the power storage device 300. Since the transistor 261 is off, the path of the current to the power storage device 300 is disconnected and the power storage device 300 is not charged.

In contrast, at the time of discharge, the voltage $V_{HCON}$ is set at the high-level voltage (H) and the voltage $V_{CCON}$ is set at the low-level voltage (L) as shown in FIG. 12B.

When the low-level voltage (L) is applied to the gate, the transistor 261 that is a p-channel transistor is turned on. When the high-level voltage (H) is applied to the gate, the transistor 263 that is an n-channel transistor is turned on.

At the time of discharge, the transistor 261 is on and the direction of flow of discharging current is the forward direction of the diode 262. That is, the discharging current from the power storage device 300 flows through the terminal 222, the power storage device 300, the diode 262, and the terminal 221. In the above manner, the power storage device 300 can be discharged.

Here, an advantage of the circuit 270 in FIG. 11 over the circuit 260 in FIG. 7A is described.

In the circuit 260 in FIG. 7A, since the transistor 261 is off when discharge is carried out at a temperature lower than T1, discharging current flows through only the diode 262. Power stored in the power storage device 300 might be partly lost at the time of discharge due to forward voltage drop in the diode 262.

In contrast, in the circuit 270 in FIG. 11, the transistor 261 is on when discharge is carried out at a temperature lower than T1. Thus, discharging current flows through both the diode 262 and the transistor 261. Accordingly, forward voltage drop does not occur in the diode 262 and thus, a loss of power stored in the power storage device 300 can be suppressed.

<<Operation at Temperature Higher than or Equal to T1>>

Figure 13:
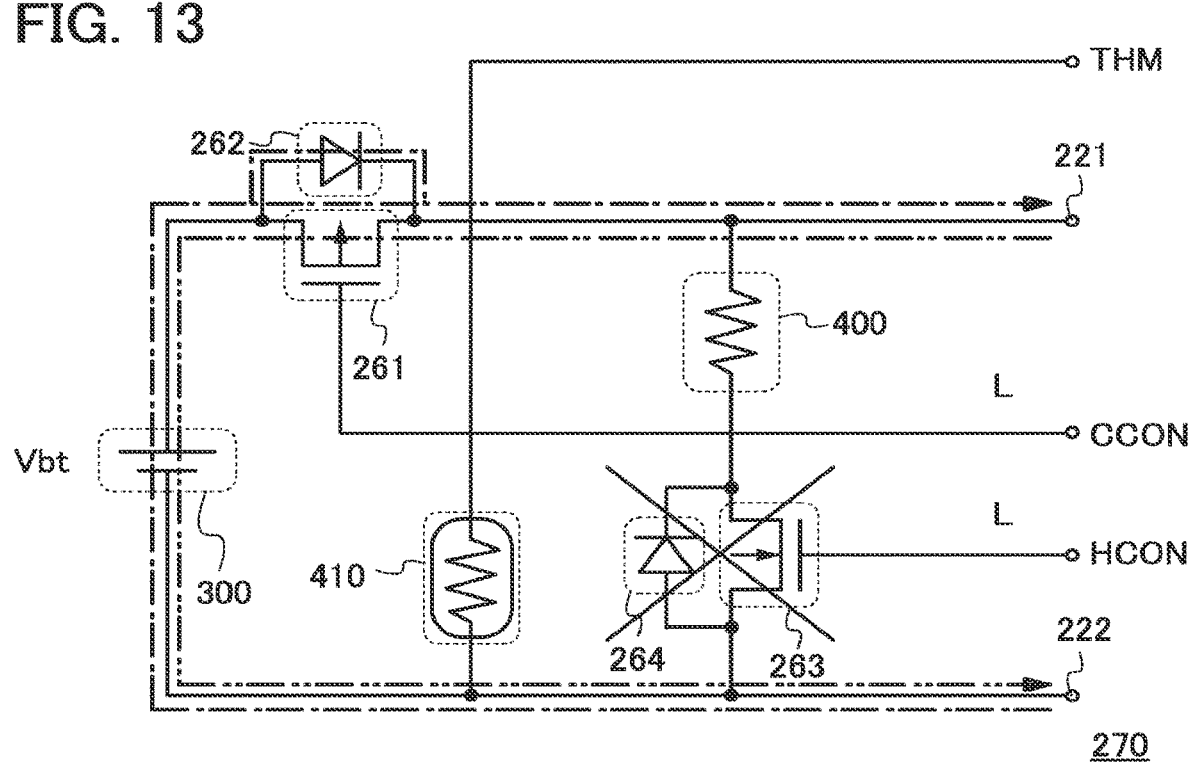
FIG. 13 illustrates operation of a power storage unit at temperatures higher than or equal to temperature T1.

In FIG. 13, operation of the circuit 270 in FIG. 11 when the temperature T is higher than or equal to T1 is illustrated.

In FIG. 13, a dash-dot-dot line denotes current at the time of charge (when positive voltage is applied to the terminal 221 and negative voltage is applied to the terminal 222), and a dash-dot line denotes current at the time of discharge. When the temperature T is higher than or equal to T1, the voltage $V_{HCON}$ is set at the low-level voltage (L). When the low-level voltage (L) is applied to the gate, the transistor 263 that is an n-channel transistor is turned off. Further, the voltage $V_{CCON}$ of the terminal CCON is also set at the low-level voltage (L). When the low-level voltage (L) is applied to the gate, the transistor 261 that is a p-channel transistor is turned on. Hence, the direction of charging current is the forward direction of the diode 262. Because the transistor 263 is off and the direction of the charging current is the reverse direction of the diode 264, the current does not flow through the heater 400.

When charge is performed in the above state, although the transistor 261 is on, charging current flows in the reverse direction of the diode 262; thus, the charging current flows through the terminal 221, the source and the drain of the transistor 261, the power storage device 300, and the terminal 222, and the power storage device 300 is charged.

At the time of discharge, the transistor 261 is on and the direction of flow of discharging current is the forward direction of the diode 262. The discharging current from the power storage device 300 flows through the terminal 222, the power storage device 300, the transistor 261, the diode 262, and the terminal 221. In the above manner, the power storage device 300 can be discharged.

<<Operation at Temperature Higher than or Equal to the T2>>

In the circuit 270 illustrated in FIG. 11, charge is allowed at a temperature higher than or equal to T1 as described above. In such a state, the charge is allowed even after the temperature T of the power storage device 300 becomes high enough to break the passivating film or to ignite the power storage device 300.

In view of the above, the upper limit of the temperature T of the power storage device 300 (the upper-limit temperature T2) is set by a user, and when the temperature of the power storage device 300 which is sensed by the temperature sensor 410 reaches T2, charge of the power storage device 300 is inhibited. In this manner, it is possible to prevent breakage of the passivating film and to prevent the power storage device 300 from catching fire.

Accordingly, a power storage unit which can safely operate at a low temperature and a high temperature can be obtained.

Figure 15:
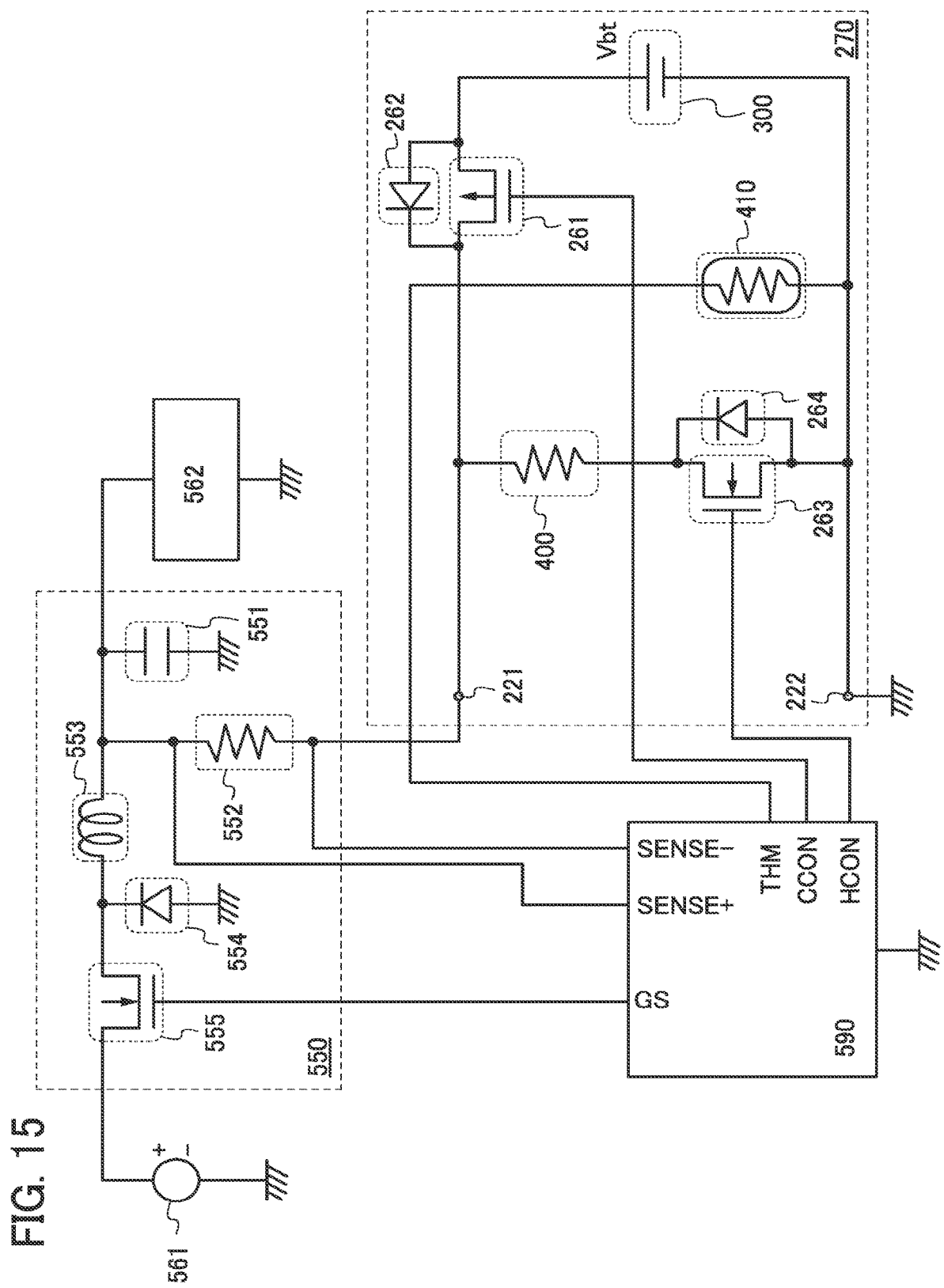
FIG. 15 is a circuit diagram illustrating a power storage unit.

FIG. 15 illustrates a circuit of the power storage unit which includes the circuit 270. The power storage unit illustrated in FIG. 15 includes the circuit 270, the current control circuit 550, and a control circuit 590.

The control circuit 590 is configured to received data on the temperature sensor 410 with the terminal THM and switch the voltage $V_{HCON}$ of the terminal HCON between the high-level voltage (H) and the low-level voltage (L) on the basis of the data. Further, the control circuit 590 switches the voltage of the terminal CCON (which is referred to as voltage $V_{CCON}$) between the high-level voltage (H) and the low-level voltage (L) on the basis of the data from the temperature sensor 410.

The control circuit 590 senses the voltage of the terminal SENSE+ and that of the terminal SENSE−, thereby measuring the current flowing between the terminal SENSE+ and the terminal SENSE−, i.e., the current flowing through the resistor 552. Further, the control circuit 590 inputs a pulse width modulation signal from the terminal GS to the gate of the transistor 555, thereby controlling the current flowing through the resistor 552.

At a temperature higher than or equal to the upper-limit temperature T2, the control circuit 590 turns off the transistor 555 by controlling the pulse width modulation signal on the basis of data on the temperature T of the power storage device 300, thereby inhibiting the charging of the power storage device 300 with the power source 561.

According to this embodiment, a power storage unit which can operate safely at a low temperature and a high temperature can be obtained.

The structures, methods, and the like described in this embodiment can be combined as appropriate with any of the structures, methods, and the like described in the other embodiments.

Embodiment 4

In this embodiment, an example in which a solar cell is used as the power source which is to be stored in the power storage device will be described.

Figure 16:
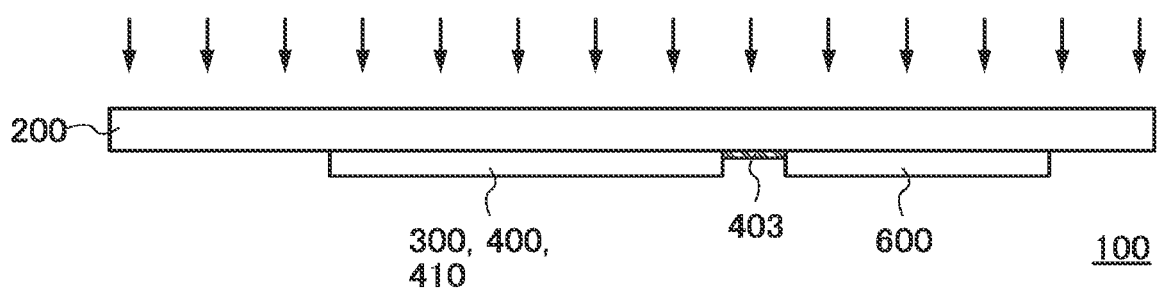
FIG. 16 is a cross-sectional view of a solar power generation unit.

An example of a solar power generation unit 100 of this embodiment in which a power storage unit and a solar cell are combined is illustrated in FIG. 16.

The solar power generation unit 100 illustrated in FIG. 16 includes a power storage unit which includes the power storage device 300, the heater 400, and the temperature sensor 410, a solar cell 200, and a control device 600. The power storage unit is provided on a surface opposite to the light-receiving surface of the solar cell 200. The power storage unit and the control device 600 are electrically connected to each other through a wiring 403.

Figure 17:
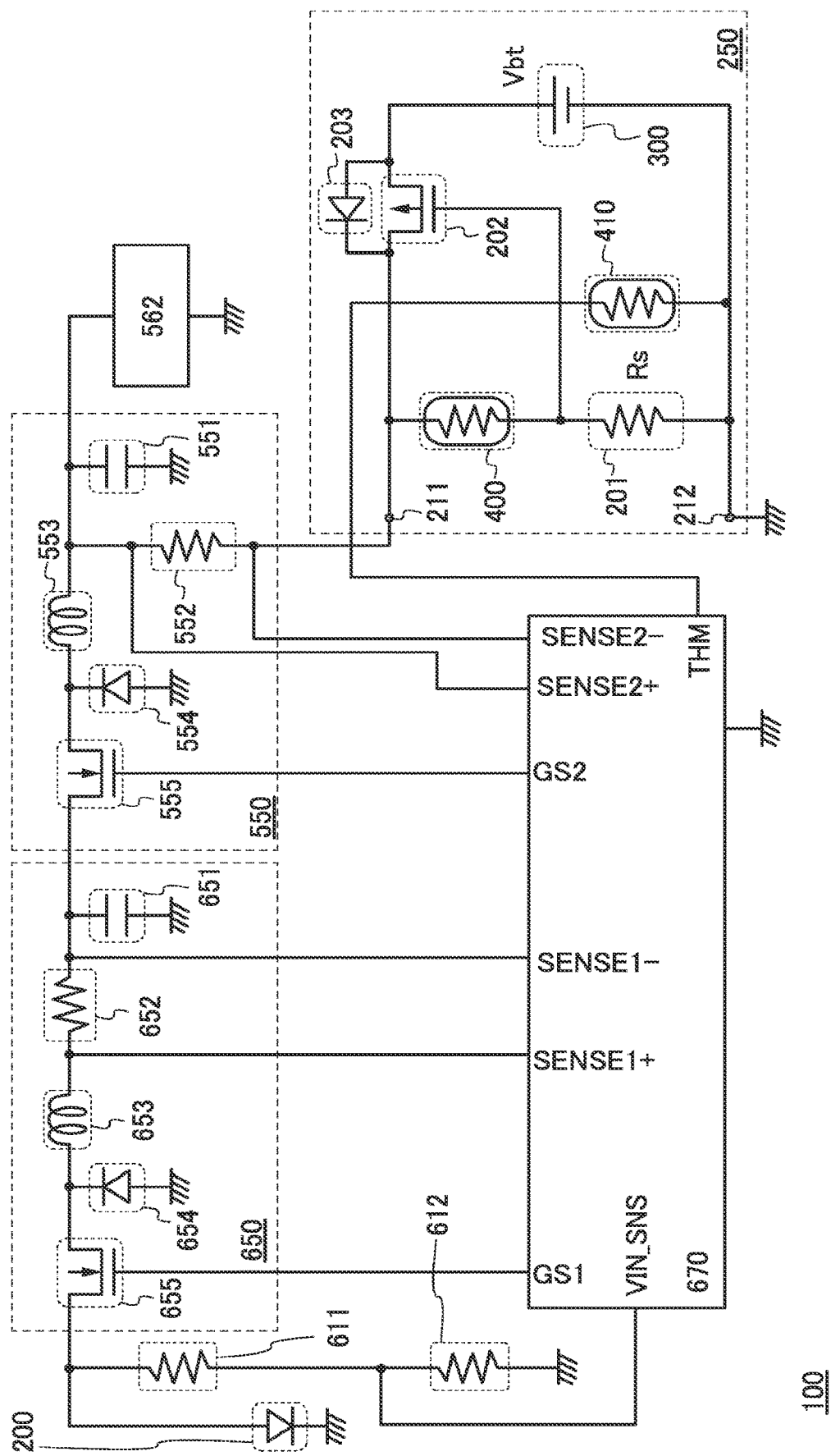
FIG. 17 is a circuit diagram illustrating a solar power generation unit.

A circuit configuration of the solar power generation unit 100 is illustrated in FIG. 17. Note that the solar power generation unit 100 includes the circuit 250 (see FIG. 3A) which uses a PTC thermistor as the heater 400.

The solar power generation unit 100 includes the solar cell 200, a resistor 611, a resistor 612, a maximum power point tracking (MPPT) circuit 650, the current control circuit 550, the circuit 250, and a control circuit 670. Note that the current control circuit 550 and the circuit 250 have the same configurations as those illustrated in FIG. 6.

One terminal of the resistor 611 is electrically connected to one terminal of the solar cell 200. The other terminal of the resistor 611 is electrically connected to one terminal of the resistor 612 and a terminal VIN_SNS of the control circuit 670. The other terminal of the resistor 612 is grounded.

The voltage applied to the terminal VIN_SNS is R2/(R1+R2)×$V_{SB}$, where $V_{SB}$ is the voltage of DC power generated by the solar cell 200 and R1 and R2 are resistances of the resistors 611 and 612, respectively. Therefore, the voltage $V_{SB}$ of the DC power generated by the solar cell 200 can be measured by sensing of the voltage applied to the terminal VIN_SNS.

The MPPT circuit 650 is a current control circuit using a step-down DC-DC converter and includes a capacitor 651, a resistor 652, a coil 653, a diode 654, and a transistor 655.

One terminal of the capacitor 651 is electrically connected to the current control circuit 550, one terminal of the resistor 652, and a terminal SENSE1− of the control circuit 670. The other terminal of the capacitor 651 is grounded.

The other terminal of the resistor 652 is electrically connected to the one terminal of the coil 653 and a terminal SENSE1+ of the control circuit 670. The voltage applied to each of the terminals of the resistor 652 is equal to the voltage applied to each of the terminal SENSE1+ and the terminal SENSE1− of the control circuit 670. Accordingly, the current flowing through the resistor 652 can be measured.

The one terminal of the coil 653 is electrically connected to the other terminal of the resistor 652. The other terminal of the coil 653 is electrically connected to a cathode of the diode 654 and one of a source and a drain of the transistor 655. An anode of the diode 654 is grounded.

The transistor 655 is an n-channel transistor and a gate thereof is electrically connected to a terminal GS1 of the control circuit 670. When a pulse width modulation signal is input from the control circuit 670 to the gate of the transistor 655, the current flowing through the resistor 652 can be controlled.

The other of the source and the drain of the transistor 655 is electrically connected to the one terminal of the resistor 611.

The voltage $V_{SB}$ of the DC power generated by the solar cell 200 varies depending on the state of the solar cell 200. In view of this, the MPPT circuit 650 changes the current depending on the value of the voltage $V_{SB}$ of the DC power, whereby the power which can be extracted from the solar cell 200 can be maximized.

For the current control circuit 550 and the circuit 250, the detailed description of the current control circuit 550 and the circuit 250 with reference to FIG. 6 may be referred to. Note that in the control circuit 670 in FIG. 17, a terminal GS2, a terminal SENSE2+, and a terminal SENSE2− are respectively substituted for the terminal GS, the terminal SENSE+, and the terminal SENSE− of the control circuit 570 in FIG. 6.

Further, as in FIG. 14, the temperature sensor 410 may be omitted from the circuit 250 in FIG. 17, as long as the power storage unit is used at temperatures lower than the temperature at which the passivating film is broken or temperatures lower than the temperature at which the power storage device 300 catches fire.

Figure 18:
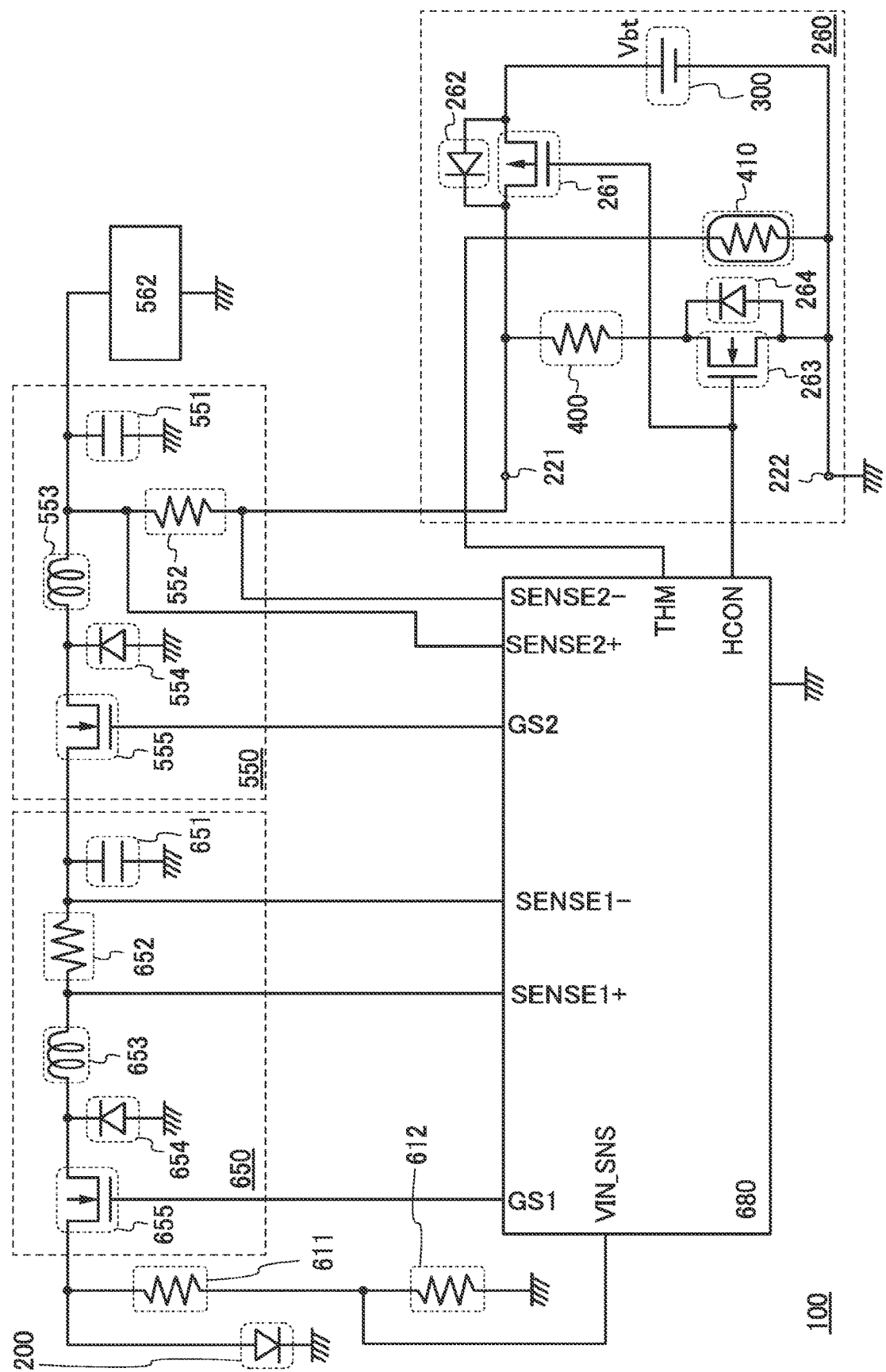
FIG. 18 is a circuit diagram illustrating a solar power generation unit.

FIG. 18 illustrates a circuit configuration of the solar power generation unit which is different from that illustrated in FIG. 17. The solar power generation unit 100 includes the circuit 260 in FIG. 7A using the heater 400, whose resistance is substantially constant irrespective of temperatures.

The solar power generation unit 100 includes the solar cell 200, the resistor 611, the resistor 612, the MPPT circuit 650, the current control circuit 550, the circuit 260, and a control circuit 680. The configurations of the solar cell 200, the resistor 611, the resistor 612, and the MPPT circuit 650 are the same as those illustrated in FIG. 17. Note that in FIG. 18, the control circuit 680 is substituted for the control circuit 670 in FIG. 17.

The current control circuit 550 and the circuit 260 have the same configurations as those illustrated in FIG. 10. Note that in the control circuit 680 in FIG. 18, the terminal GS2, the terminal SENSE2+, and the terminal SENSE2− are respectively substituted for the terminal GS, the terminal SENSE+, and the terminal SENSE− of the control circuit 580 in FIG. 10.

Figure 19:
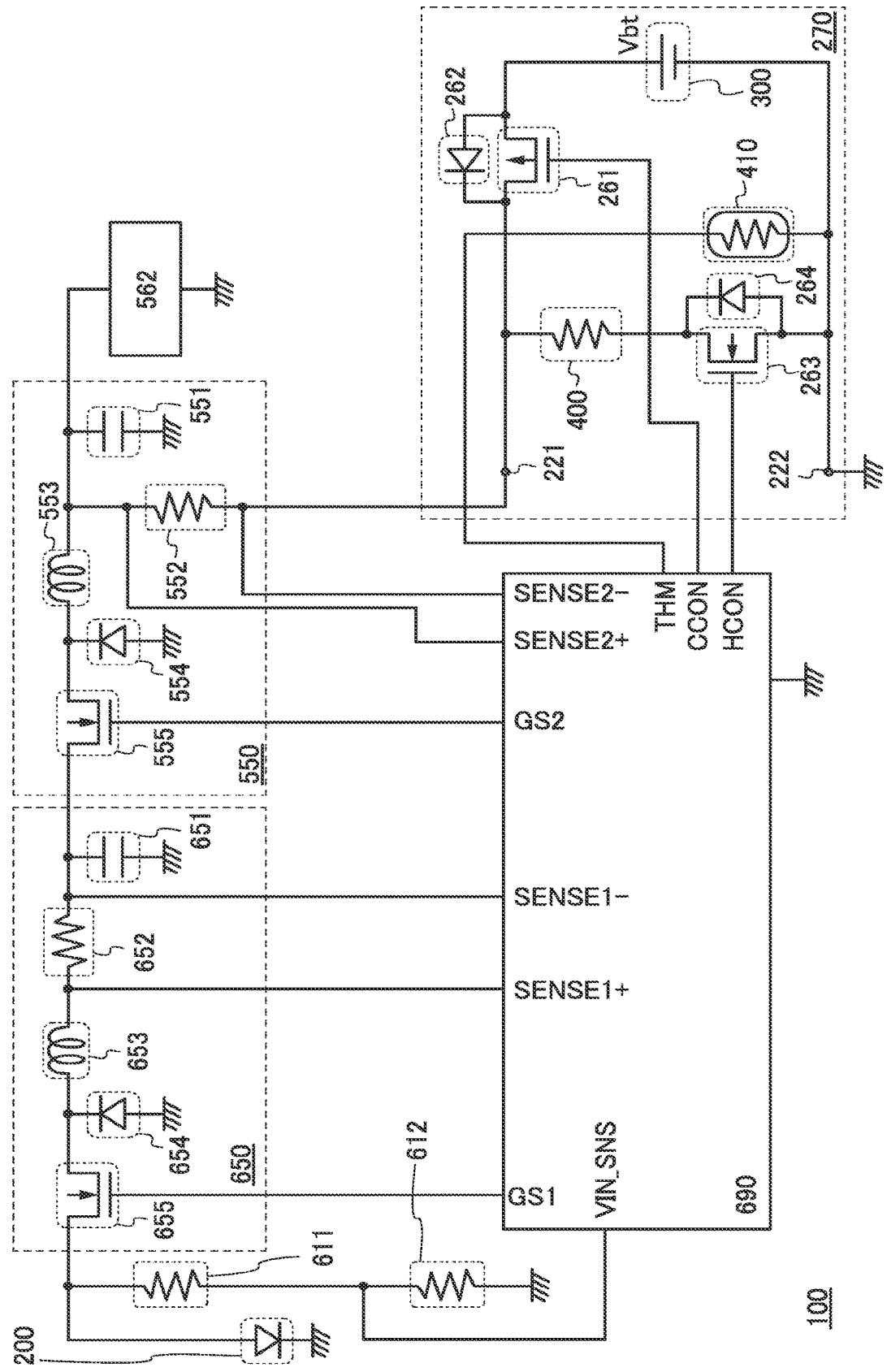
FIG. 19 is a circuit diagram illustrating a solar power generation unit.

FIG. 19 illustrates a circuit configuration of the solar power generation unit which is different from that illustrated in FIG. 17 or FIG. 18. The solar power generation unit 100 includes the circuit 270 in FIG. 11 using the heater 400, whose resistance is substantially constant irrespective of temperatures.

The solar power generation unit 100 includes the solar cell 200, the resistor 611, the resistor 612, the MPPT circuit 650, the current control circuit 550, the circuit 270, and a control circuit 690. The configurations of the solar cell 200, the resistor 611, the resistor 612, and the MPPT circuit 650 are the same as those illustrated in FIG. 17. Note that in FIG. 19, the control circuit 690 is substituted for the control circuit 670 in FIG. 17.

The current control circuit 550 and the circuit 270 have the same configurations as those illustrated in FIG. 15. Note that in the control circuit 690 in FIG. 19, the terminal GS2, the terminal SENSE2+, and the terminal SENSE2− are respectively substituted for the terminal GS, the terminal SENSE+, and the terminal SENSE− of the control circuit 590 in FIG. 15.

The structures, methods, and the like described in this embodiment can be combined as appropriate with any of the structures, methods, and the like described in the other embodiments.

REFERENCE NUMERALS

100: solar power generation unit, 200: solar cell, 201: resistor, 202: transistor, 203: diode, 211: terminal, 212:

terminal, 221: terminal, 222: terminal, 250: circuit, 255: circuit, 260: circuit, 261: transistor, 262: diode, 263: transistor, 264: diode, 270: circuit, 300: power storage device, 301: positive electrode current collector, 302: positive electrode active material layer, 304: negative electrode active material layer, 305: negative electrode current collector, 307: separator, 308: electrolyte, 309: exterior body, 310: power storage device, 311: positive electrode, 312: negative electrode, 400: heater, 403: wiring, 401*a*: terminal, 401*b*: terminal, 410: temperature sensor, 411*a*: terminal, 411*b*: terminal, 500: exterior body, 501*a*: terminal, 501*b*: terminal, 502*a*: terminal, 502*b*: terminal, 503*a*: terminal, 503*b*: terminal, 550: current control circuit, 551: capacitor, 552: resistor, 553: coil, 554: diode, 555: transistor, 561: power source, 562: load, 570: control circuit, 580: control circuit, 590: control circuit, 611: resistor, 612: resistor, 650: MPPT circuit, 651: capacitor, 652: resistor, 653: coil, 654: diode, 655: transistor, 670: control circuit, 680: control circuit, and 690: control circuit.

This application is based on Japanese Patent Application serial no. 2012-143765 filed with Japan Patent Office on Jun. 27, 2012, the entire contents of which are hereby incorporated by reference.

What is claimed is:

1. A unit comprising:
   a first circuit;
   a second circuit;
   a third circuit;
   a power source; and
   a control circuit electrically connected to the first circuit, the second circuit, the third circuit, and the power source,
   wherein the first circuit comprises:
      a power storage device;
      a first transistor;
      a first diode; and
      a temperature sensor,
   wherein one of a source and a drain of the first transistor is electrically connected to the power storage device,
   wherein one terminal of the first diode is electrically connected to the power storage device,
   wherein the temperature sensor is configured to sense a temperature of the power storage device,
   wherein the control circuit is configured to measure first current flowing through the first circuit and second current flowing from the power source to the second circuit through the third circuit,
   wherein the control circuit is configured to control the first current flowing through the first circuit and the second current flowing from the power source to the second circuit through the third circuit, and
   wherein the control circuit is configured to input a signal to a gate of the first transistor on the basis of data input from the temperature sensor.

2. The unit according to claim 1, wherein the control circuit is configured to inhibit charging of the power storage device with the power source on the basis of data input from the temperature sensor.

3. The unit according to claim 1, wherein the control circuit is configured to control the second current flowing from the power source to the second circuit through the third circuit on the basis of voltage of the power source.

4. A unit comprising:
   a first circuit;
   a second circuit;
   a third circuit;
   a power source; and
   a control circuit electrically connected to the first circuit, the second circuit, the third circuit, and the power source,
   wherein the first circuit comprises:
      a power storage device;
      a first transistor being p-channel transistor;
      a first diode; and
      a temperature sensor,
   wherein a drain of the first transistor is electrically connected to a positive electrode of the power storage device,
   wherein an anode of the first diode is electrically connected to the positive electrode of the power storage device,
   wherein the temperature sensor is configured to sense a temperature of the power storage device,
   wherein a gate of the first transistor is electrically connected to the control circuit,
   wherein the second circuit comprises:
      a first resistor; and
      a second transistor,
   wherein one terminal of the first resistor is electrically connected to a drain of the second transistor and the control circuit,
   wherein the other terminal of the first resistor is electrically connected to the first circuit and the control circuit,
   wherein a gate of the second transistor is electrically connected to the control circuit,
   wherein the third circuit comprises:
      a second resistor; and
      a third transistor,
   wherein one terminal of the second resistor is electrically connected to the second circuit and the control circuit,
   wherein the other terminal of the second resistor is electrically connected to one of a source and a drain of the third transistor and the control circuit,
   wherein the other one of the source and the drain of the third circuit is electrically connected to the power source,
   wherein a gate of the third transistor is electrically connected to the control circuit.

5. The unit according to claim 4, wherein the control circuit is configured to input a signal to the gate of the first transistor on the basis of data input from the temperature sensor.

6. The unit according to claim 4, wherein the control circuit is configured to inhibit charging of the power storage device with the power source on the basis of data input from the temperature sensor.

7. The unit according to claim 4, wherein the control circuit is configured to measure first current flowing through the first circuit and second current flowing from the power source to the second circuit through the third circuit.

8. The unit according to claim 7, wherein the control circuit is configured to control the second current flowing from the power source to the second circuit through the third circuit on the basis of voltage of the power source.

9. A unit comprising:
   a first circuit;
   a second circuit;
   a third circuit;
   a power source; and
   a control circuit electrically connected to the first circuit, the second circuit, the third circuit, and the power source, wherein the first circuit comprises:
  a power storage device;
  a first transistor being p-channel transistor;
  a first diode; and
  a temperature sensor,
wherein a drain of the first transistor is electrically connected to a positive electrode of the power storage device,
wherein an anode of the first diode is electrically connected to the positive electrode of the power storage device,
wherein the temperature sensor is configured to sense a temperature of the power storage device,
wherein a gate of the first transistor is electrically connected to the control circuit,
wherein the second circuit comprises:
  a first capacitor;
  a first resistor;
  a first coil;
  a second diode; and
  a second transistor,
wherein one terminal of the first capacitor is electrically connected to one terminal of the first resistor, one terminal of the first coil, and the control circuit,
wherein the other terminal of the first capacitor is grounded,
wherein the other terminal of the first resistor is electrically connected to the first circuit and the control circuit,
wherein the other terminal of the first coil is electrically connected to a cathode of the second diode and a drain of the second transistor,
wherein an anode of the second diode is grounded,
wherein a gate of the second transistor is electrically connected to the control circuit,
wherein a source of the second transistor is electrically connected to the third circuit,
wherein the third circuit comprises:
  a second capacitor;
  a second resistor;
  a second coil;
  a third diode;
  a third transistor,
wherein one terminal of the second capacitor is electrically connected to one terminal of the second resistor, the second circuit, and the control circuit,
wherein the other terminal of the second capacitor is grounded,
wherein the other terminal of the second resistor is electrically connected to one terminal of the second coil and the control circuit,
wherein the other terminal of the second coil is electrically connected to a cathode of the third diode and one of a source and a drain of the third transistor,
wherein an anode of the third diode is grounded,
wherein a gate of the third transistor is electrically connected to the control circuit,
wherein the other one of the source and the drain of the third transistor is electrically connected to the power source.

10. The unit according to claim 9, wherein the control circuit is configured to input a signal to the gate of the first transistor on the basis of data input from the temperature sensor.

11. The unit according to claim 9, wherein the control circuit is configured to inhibit charging of the power storage device with the power source on the basis of data input from the temperature sensor.

12. The unit according to claim 9, wherein the control circuit is configured to measure first current flowing through the first circuit and second current flowing from the power source to the second circuit through the third circuit.

13. The unit according to claim 12, wherein the control circuit is configured to control the second current flowing from the power source to the second circuit through the third circuit on the basis of voltage of the power source.

\* \* \* \* \*